(12) United States Patent
Kitazato et al.

(10) Patent No.: US 8,917,358 B2
(45) Date of Patent: Dec. 23, 2014

(54) RECEPTION APPARATUS, TERMINAL APPARATUS, CONTROL METHOD, PROGRAM, AND COMMUNICATION SYSTEM

(75) Inventors: Naohisa Kitazato, Tokyo (JP); Yoshiharu Dewa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/554,688

(22) Filed: Jul. 20, 2012

(65) Prior Publication Data

US 2013/0031569 A1 Jan. 31, 2013

Related U.S. Application Data

(60) Provisional application No. 61/512,254, filed on Jul. 27, 2011.

(51) Int. Cl.
| | |
|---|---|
| H04N 21/236 | (2011.01) |
| H04N 21/6543 | (2011.01) |
| H04N 21/81 | (2011.01) |
| H04N 21/462 | (2011.01) |
| H04N 21/41 | (2011.01) |
| H04N 21/442 | (2011.01) |
| H04N 21/434 | (2011.01) |
| H04N 21/488 | (2011.01) |

(52) U.S. Cl.
CPC ..... *H04N 21/23614* (2013.01); *H04N 21/6543* (2013.01); *H04N 21/8133* (2013.01); *H04N 21/8173* (2013.01); *H04N 21/4882* (2013.01); *H04N 21/4622* (2013.01); *H04N 21/4122* (2013.01); *H04N 21/44227* (2013.01); *H04N 21/4348* (2013.01)
USPC ............................................ 348/723; 725/54

(58) Field of Classification Search
CPC ............................... H04N 5/38; H04N 5/4401
USPC ............................................ 348/723; 725/54
See application file for complete search history.

(56) References Cited

U.S. PATENT DOCUMENTS

| | | |
|---|---|---|
| 2003/0033157 A1 | 2/2003 | Dempski et al. |
| 2003/0086003 A1 | 5/2003 | Koga |

(Continued)

FOREIGN PATENT DOCUMENTS

| | | |
|---|---|---|
| EP | 1 389 020 A1 | 2/2004 |
| JP | 2006-050237 | 2/2006 |

(Continued)

OTHER PUBLICATIONS

International Search Report issued Jul. 17, 2012 in PCT/JP2012/064806 filed Jun. 8, 2012 (with English-language translation).

(Continued)

*Primary Examiner* — Jefferey Harold
*Assistant Examiner* — Justin Sanders
(74) *Attorney, Agent, or Firm* — Oblon, Spivak, McClelland, Maier & Neustadt, L.L.P.

(57) ABSTRACT

Disclosed herein is a reception apparatus including: a reception portion configured to receive AV content being transmitted; a command execution portion configured to execute a first application program in response to a first command for controlling the operation of the first application program executed in interlocked related to the AV content; a command transmission portion configured to transmit to an external terminal apparatus a second command for controlling the operation of a second application program that can be executed by the terminal apparatus in interlocked relation to the AV content when the terminal apparatus is connected to the reception apparatus; and a command reception portion configured to receive the first command transmitted from the terminal apparatus executing the second application program. The command execution portion executes the first application program in response to the received first command.

19 Claims, 28 Drawing Sheets

(56) References Cited

U.S. PATENT DOCUMENTS

| | | |
|---|---|---|
| 2004/0027452 A1 | 2/2004 | Yun et al. |
| 2004/0031058 A1* | 2/2004 | Reisman ............... 725/112 |
| 2006/0194535 A1 | 8/2006 | Houldsworth et al. |
| 2006/0242692 A1* | 10/2006 | Thione et al. ............... 726/9 |
| 2007/0169164 A1 | 7/2007 | Marilly et al. |
| 2008/0028074 A1 | 1/2008 | Ludvig |
| 2008/0120638 A1 | 5/2008 | King et al. |
| 2008/0247543 A1* | 10/2008 | Mick et al. ............... 380/201 |
| 2009/0087161 A1 | 4/2009 | Roberts et al. |
| 2009/0125946 A1 | 5/2009 | Fukuda |
| 2009/0320064 A1 | 12/2009 | Soldan et al. |
| 2010/0205628 A1 | 8/2010 | Davis et al. |
| 2011/0075990 A1 | 3/2011 | Eyer |
| 2011/0088075 A1 | 4/2011 | Eyer |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0002111 A1* | 1/2012 | Sandoval et al. ............ 348/521 |
| 2012/0044418 A1 | 2/2012 | Eyer |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |

FOREIGN PATENT DOCUMENTS

| | | |
|---|---|---|
| JP | 2007-116669 A | 5/2007 |
| JP | 2009-118343 A | 5/2009 |
| WO | WO 2010/109860 A1 | 9/2010 |

OTHER PUBLICATIONS

Kentaro Yamazaki, "Open House 2011. Linking the TV and the SNS [Hybridcast]", online URL: http://av.watch.impress.co.jp/docs/news/20110524_448049.html; May 24, 2011, pp. 1-6 plus cover page.

U.S. Appl. No. 13/304,126, filed Nov. 23, 2011, Eyer.
U.S. Appl. No. 13/422,203, filed Mar. 16, 2012, Kitazato, et al.
U.S. Appl. No. 13/452,376, filed Apr. 20, 2012, Kitahara, et al.
U.S. Appl. No. 13/562,946, filed Jul. 31, 2012, Eyer.
U.S. Appl. No. 13/559,166, filed Jul. 26, 2012, Eyer.
U.S. Appl. No. 13/490,216, filed Jun. 6, 2012, Eyer.
U.S. Appl. No. 13/554,688, filed Jul. 20, 2012, Eyer.
U.S. Appl. No. 13/559,188, filed Jul. 26, 2012, Kitazato.
U.S. Appl. No. 13/527,435, filed Jun. 19, 2012, Eyer.
Extended European Search Report issued May 8, 2014 in Patent Application No. 11828912.3.
Extended European Search Report issued May 12, 2014 in Patent Application No. 11828914.9.
Extended European Search Report issued Feb. 6, 2014 in Patent Application No. 11828915.6.
Office Action issued Feb. 20, 2014 in Japanese Patent Application No. 2013-520530 (with English language translation).
Extended European Search Report issued Feb. 26, 2014 in Patent Application No. 11828910.7.
Extended European Search Report issued Mar. 6, 2014 in Patent Application No. 11828911.5.
Extended European Search Report issued Oct. 1, 2014 in European Patent Application No. 12800685.5.

* cited by examiner

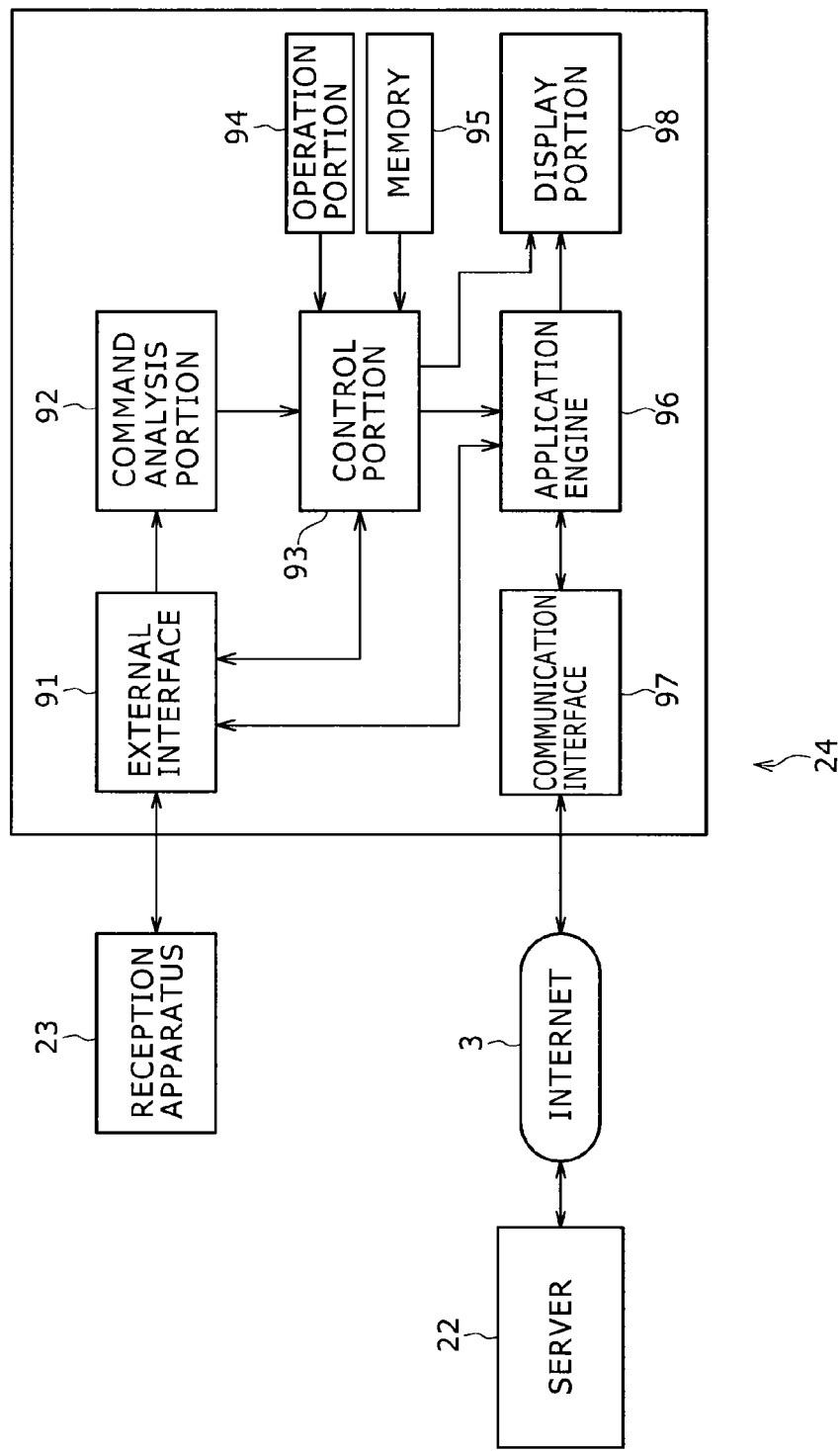

FIG. 5

Trigger with "Register" Command

| Item | No. of Bits | explanation |
|---|---|---|
| Trigger_id | 8 | IDENTIFICATION OF TRIGGER INFORMATION WITH THE SAME CONTENT |
| Protocol_version | 8 | FIXED TO 0 (PROTOCOL VERSION NO.) |
| Command_code | 8 | VALUE INDICATIVE OF Register COMMAND |
| Trigger_validity | 8 | INFORMATION INDICATING PROBABILITY OF TRIGGER INFORMATION BECOMING VALID |
| App_id | N | APPLICATION ID (ALSO INDICATING URL OF APPLICATION BODY) |
| App_type | 4 | APPLICATION TYPE |
| App_life_span | 1 | SCOPE OF APPLICATION OPERATION |
| Persistent_priority | 2 | PRIORITY OF ACQUIRING AND RETAINING APPLICATION BODY |
| Expire_date | 32 | EXPIRATION DATE |

FIG. 6

Trigger with "Execute" Command

| Item | No. of Bits | explanation |
|---|---|---|
| Trigger_id | 8 | IDENTIFICATION OF TRIGGER INFORMATION WITH THE SAME CONTENT |
| Protocol_version | 8 | FIXED TO 0 (PROTOCOL VERSION NO.) |
| Command_code | 8 | VALUE INDICATIVE OF Execute COMMAND |
| Trigger_validity | 8 | INFORMATION INDICATING PROBABILITY OF TRIGGER INFORMATION BECOMING VALID |
| App_id | N | APPLICATION ID (ALSO INDICATING URL OF APPLICATION BODY) |
| App_type | 4 | APPLICATION TYPE |
| TDO_life_scope | 1 | SCOPE OF APPLICATION OPERATION |
| Expire_date | 32 | EXPIRATION DATE |

FIG. 7

Trigger with "Inject_event" Command

| Item | No. of Bits | explanation |
|---|---|---|
| Trigger_id | 8 | IDENTIFICATION OF TRIGGER INFORMATION WITH THE SAME CONTENT |
| Protocol_version | 8 | FIXED TO 0 (PROTOCOL VERSION NO.) |
| Command_code | 8 | VALUE INDICATIVE OF Inject_event COMMAND |
| Trigger_validity | 8 | INFORMATION INDICATING PROBABILITY OF TRIGGER INFORMATION BECOMING VALID |
| App_id | N | APPLICATION ID (ALSO INDICATING URL OF APPLICATION BODY) |
| Event_id | 8 | EVENT ID DESCRIBED IN TARGET APPLICATION |
| Event Embedded Data | M | DATA TO BE HANDED OVER TO APPLICATION UPON INJECTION OF EVENT |

FIG. 8

Trigger with "Suspend" Command

| Item | No. of Bits | explanation |
|---|---|---|
| Trigger_id | 8 | IDENTIFICATION OF TRIGGER INFORMATION WITH THE SAME CONTENT |
| Protocol_version | 8 | FIXED TO 0 (PROTOCOL VERSION NO.) |
| Command_code | 8 | VALUE INDICATIVE OF Suspend COMMAND |
| Trigger_validity | 8 | INFORMATION INDICATING PROBABILITY OF TRIGGER INFORMATION BECOMING VALID |
| App_id | N | APPLICATION ID (ALSO INDICATING URL OF APPLICATION BODY) |

FIG. 9

Trigger with "Terminate" Command

| Item | No. of Bits | explanation |
|---|---|---|
| Trigger_id | 8 | IDENTIFICATION OF TRIGGER INFORMATION WITH THE SAME CONTENT |
| Protocol_version | 8 | FIXED TO 0 (PROTOCOL VERSION NO.) |
| Command_code | 8 | VALUE INDICATIVE OF Terminate COMMAND |
| Trigger_validity | 8 | INFORMATION INDICATING PROBABILITY OF TRIGGER INFORMATION BECOMING VALID |
| App_id | N | APPLICATION ID (ALSO INDICATING URL OF APPLICATION BODY) |

FIG. 10

| Syntax | No. of Bits | Format |
|---|---|---|
| Trigger_Info_data() { | | |
|   trigger_id | 8 | uimsbf |
|   protocol_version | 8 | uimsbf" |
|   command_code | 8 | uimsbf |
|   trigger_validity | 8 | uimsbf |
|   app_id_length | 8 | uimsbf |
|   for(i=0;i<N;i++) { | | |
|     app_id_byte | 8 | bslbsf |
|   } | | |
|   if(command_code==1 \|\| command_code==2) { | | (register/execute) |
|     app_type | 4 | uimsbf |
|     app_life_span | 1 | uimsbf |
|     persistent_priority | 2 | Uimsbf |
|     reserved | 1 | |
|     app_expire_date | 32 | uimsbf |
|   } | | |
|   if(command_code==3) { | | (Inject event) |
|     event_id | 16 | uimsbf |
|     event_embedded_data_length | 8 | uimsbf |
|     for(i=0;i<N;i++) { | | |
|       event_embedded_data_byte | 8×N | bslbf |
|     } | | |
|   } | | |
| } | | |

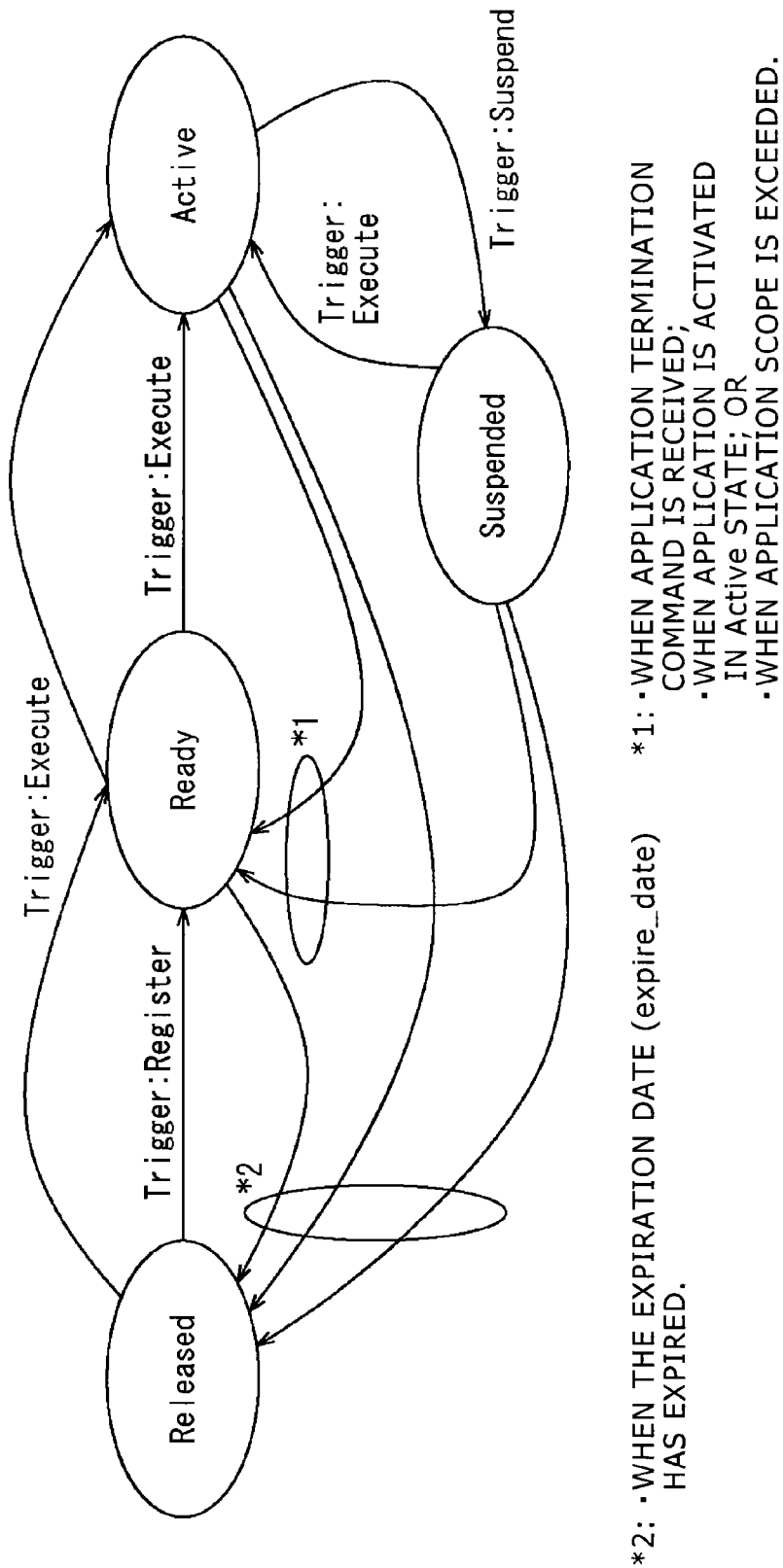

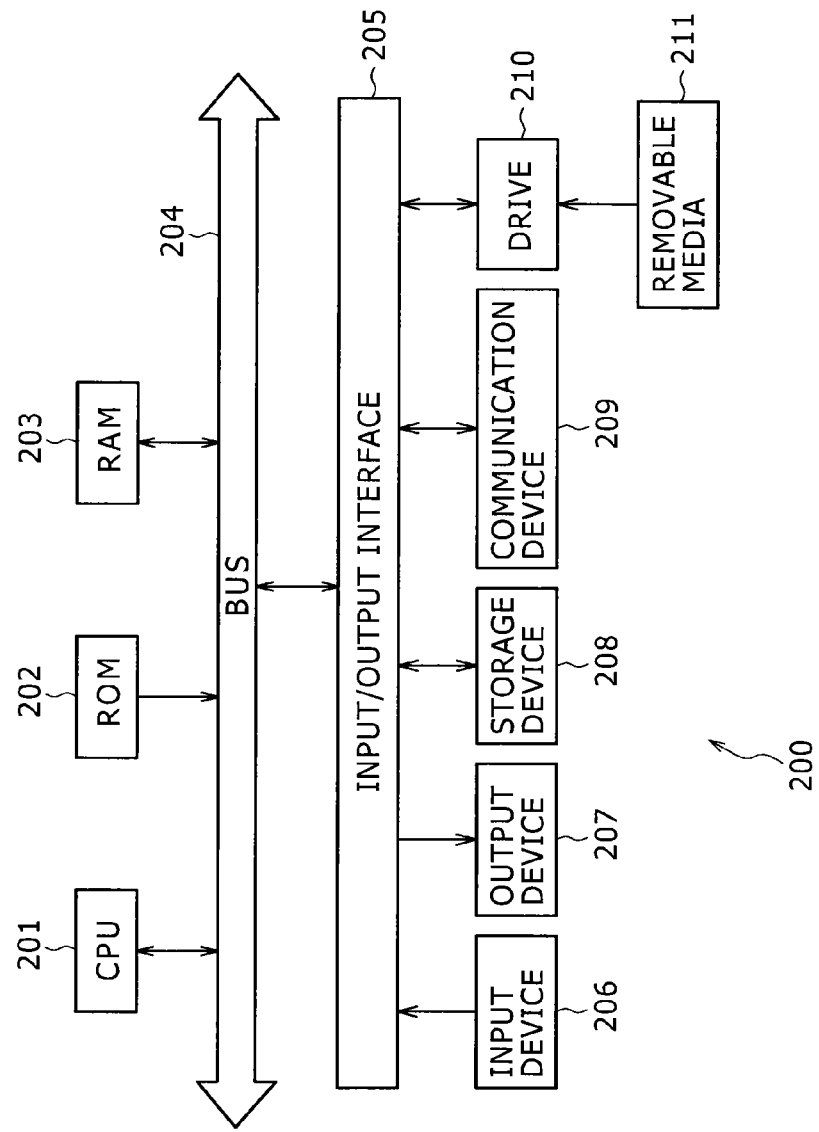

RECEPTION APPARATUS, TERMINAL APPARATUS, CONTROL METHOD, PROGRAM, AND COMMUNICATION SYSTEM

CROSS-REFERENCE TO RELATED APPLICATION

This application claims the benefit of priority of U.S. Ser. No. 61/512,254, filed on Jul. 27, 2011, the entire contents of which are incorporated herein by reference.

BACKGROUND

The present technology relates to a reception apparatus, a terminal apparatus, a control method, a program, and a communication system. More particularly, this technology relates to a reception apparatus, a terminal apparatus, a control method, a program, and a communication system for controlling the operation of a predetermined application program in interlocked relation to AV (Audio Visual) content such as a program.

In digital broadcasting, not only television program broadcast services but also so-called data broadcast services have been implemented today (e.g., see Japanese Patent Laid-open No. 2006-50237). Studies are underway on the introduction of more advanced services that utilize the Internet in conjunction with digital underway on the introduction of more advanced services that utilize the Internet in conjunction with digital television broadcasts from now on.

For example, the advanced services using the Internet in conjunction with digital television broadcasts and currently under consideration may include application programs that are supplied to a reception apparatus via the Internet to control the operation of the reception apparatus in interlocked relation to the AV content of a program, or to operate an external apparatus connected to the reception apparatus in interlocked relation to the AV content.

SUMMARY

However, the technology of controlling the operation of an external apparatus connected to the reception apparatus in interlocked relation to the currently received AV content has yet to be established.

The present technology has been made in view of the above circumstances and provides arrangements for controlling the operation of an external apparatus connected to the reception apparatus in interlocked relation to AV content.

According to a first embodiment of the present technology, there is provided a reception apparatus including: a reception portion configured to receive AV (audio visual) content being transmitted; a command execution portion configured to execute a first application program in response to a first command for controlling the operation of the first application program executed in interlocked related to the AV content; a command transmission portion configured to transmit to an external terminal apparatus a second command for controlling the operation of a second application program that can be executed by the terminal apparatus in interlocked relation to the AV content when the terminal apparatus is connected to the reception apparatus; and a command reception portion configured to receive the first command transmitted from the terminal apparatus executing the second application program. The command execution portion executes the first application program in response to the received first command.

Preferably, the reception apparatus of the present disclosure may further include a trigger extraction portion configured to extract trigger information which is transmitted along with the AV content and which pertains to the control of the first application program. The command execution portion executes the first application program in response to the first command designated by the extracted trigger information.

Preferably, if the terminal apparatus has yet to execute the second application program, the command transmission portion may transmit the second command for activating the second application program, and if the reception apparatus has terminated the execution of the first application program, the command transmission portion may transmit the second command for terminating the execution of the second application program.

Preferably, if the terminal apparatus is executing the second application program, the command transmission portion may transmit the second command for causing the second application program to perform a specific process, and if the reception apparatus has terminated the execution of the first application program, the command transmission portion may transmit the second command for terminating the currently executing specific process.

Preferably, in response to the first command received from the terminal apparatus, the command execution portion may either maintain the display of information displayed by the first application program, delete the display of the information, or update the display of the information.

Preferably, the trigger information may include the first command designating acquisition, registration, or activation of the first application program, or injection, suspension, or termination of an event, and in response to the first command, the command execution portion may execute the acquisition, registration, or activation of the first application program, the injection of an event into the currently executing first application program, the suspension of the currently executing first application program, or the termination of the currently executing first application program.

Also according to the first embodiment of the present technology, there is provided a control method or a first program functionally corresponding to the above-outlined reception apparatus according to the first aspect of this technology.

Where the reception apparatus, control method, and first program according to the first embodiment of this technology are in use, AV content being transmitted is first received. The first application program is executed in response to the first command for controlling the operation of the first application program to be executed in interlocked relation to the AV content. When the reception apparatus is connected to the external terminal apparatus and when the terminal apparatus can execute the second application program to be executed in interlocked relation to the AV content, the second command for controlling the operation of the second application program is transmitted to the terminal apparatus. The first command transmitted from the terminal apparatus executing the second application program is received. The first application program is executed in response to the received first command.

According to a second embodiment of the present technology, there is provided a terminal apparatus including: a command reception portion configured to receive a second command for controlling the operation of a second application program executed in interlocked relation to AV content being received, the second command being transmitted from a reception apparatus executing a first application program in interlocked relation to the received AV content; a command execution portion configured to execute the second application program in response to the received second command; and a command transmission portion configured to transmit to the reception apparatus a first command for controlling the operation of the first application program in accordance with the operation of the second application program.

Preferably, if the terminal apparatus is not executing the second application program, the command reception portion may receive the second command for activating the second application program; and if the reception apparatus has terminated the execution of the first application program, the command reception portion may receive the second command for terminating the execution of the second application program.

Preferably, if a user has permitted the activation of the second application program, the command execution portion may activate the second application program in response to the second command.

Preferably, if the terminal apparatus is executing the second application program, the command reception portion may receive the second command for causing the second application program to execute a specific process; and if the reception apparatus has terminated the execution of the first application program, the command reception portion may receive the second command for terminating the currently executing specific process.

Preferably, if a user has permitted the execution of the specific process, the command execution portion may cause the second application program to execute the specific process in response to the second command.

Also according to the first embodiment of the present technology, there is provided a control method or a second program functionally corresponding to the above-outlined terminal apparatus according to the second embodiment of this technology.

Where the terminal apparatus, control method, and second program according to the second embodiment of this technology are in use, the second command is received to control the operation of the second application program to be executed in interlocked relation to the AV content being received, the second command being transmitted from the reception apparatus executing the first application program in interlocked relation to the received AV content. The second application program is executed in response to the received second command. The first command is transmitted to the reception apparatus to control the operation of the first application program in accordance with the operation of the second application program.

According to a third embodiment of the present technology, there is provided a communication system including a reception apparatus and a terminal apparatus. The reception apparatus includes: a reception portion configured to receive AV content being transmitted; a first command execution portion configured to execute a first application program in response to a first command for controlling the operation of the first application program executed in interlocked related to the AV content; a first command transmission portion configured to transmit to the terminal apparatus a second command for controlling the operation of a second application program that can be executed by the terminal apparatus in interlocked relation to the AV content when the terminal apparatus is connected to the reception apparatus; and a first command reception portion configured to receive the first command transmitted from the terminal apparatus executing the second application program. The terminal apparatus includes: a second command reception portion configured to receive the second command transmitted from the reception apparatus; a second command execution portion configured to execute the second application program in response to the received second command; and a second command transmission portion configured to transmit to the reception apparatus the first command in accordance with the operation of the second application program. The first command execution portion executes the first application program in response to the received first command.

Where the communication system according to the third embodiment of this technology is in use, the reception apparatus first receives AV content being transmitted. The first application program is executed in response to the first command for controlling the operation of the first application program to be executed in interlocked relation to the AV content. When the reception apparatus is connected to the terminal apparatus and when the terminal apparatus can execute the second application program to be executed in interlocked relation to the AV content, the second command for controlling the operation of the second application program is transmitted to the terminal apparatus. The first command transmitted from the terminal apparatus executing the second application program is received. The first application program is executed in response to the received first command. The terminal apparatus receives the second command transmitted from the reception apparatus. The operation of the second application program is controlled in response to the received second command. The first command is transmitted to the reception apparatus in accordance with the operation of the second application program. The first application program is executed in response to the received first command.

According to one embodiment of the present technology, the external apparatus connected to the reception apparatus can be operated in interlocked relation to AV content.

BRIEF DESCRIPTION OF THE DRAWINGS

FIG. 4 is a schematic view showing a typical structure of an external apparatus;

FIG. 5 is a schematic view showing the items included in the trigger information of a register command;

FIG. 6 is a schematic view showing the items included in the trigger information of an execute command;

FIG. 7 is a schematic view showing the items included in the trigger information of an inject event command;

FIG. 8 is a schematic view showing the items included in the trigger information of a suspend command;

FIG. 9 is a schematic view showing the items included in the trigger information of a terminate command;

FIG. 10 is a schematic view showing a typical syntax of the trigger information;

FIG. 11 is a state transition diagram of a data broadcast application;

FIG. 28 is a schematic view showing a typical structure of a computer.

DETAILED DESCRIPTION OF THE PREFERRED EMBODIMENTS

Some preferred embodiments of this technology will now be described below in reference to the accompanying drawings.

[Typical Configuration of Broadcasting System]

Figure 1:
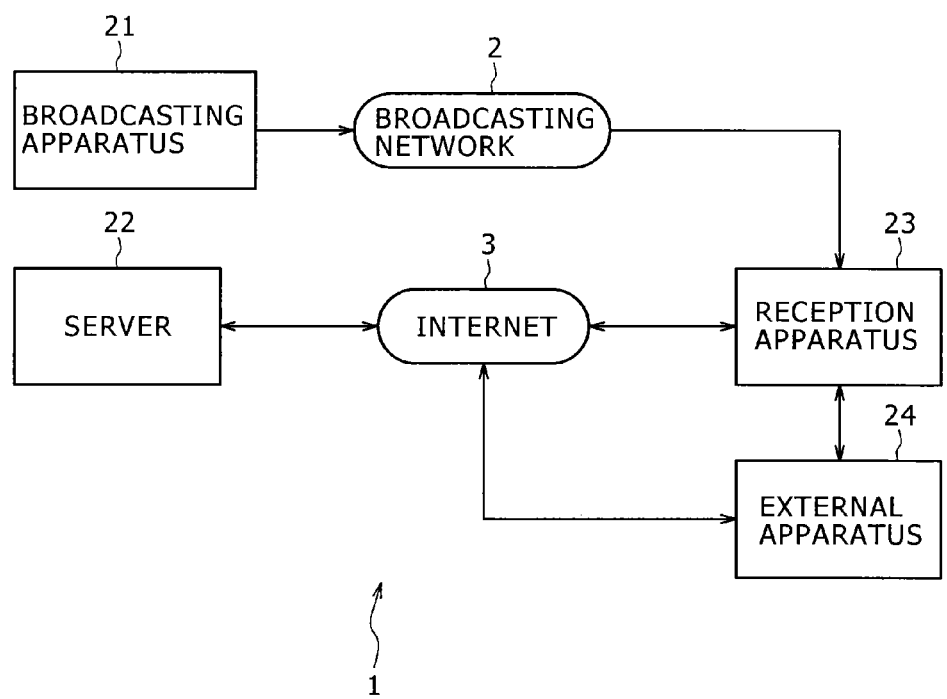
FIG. 1 is a schematic view showing a typical configuration of a broadcasting system.

FIG. 1 is a schematic view showing a typical configuration of a broadcasting system.

The broadcasting system 1 is constituted by a broadcasting apparatus 21 and a server 22 set up on the transmitting side and by a reception apparatus 23 and an external apparatus 24 installed on the receiving side.

The broadcasting apparatus 21 is designed to transmit a digital television broadcast signal via a broadcasting network such as a terrestrial digital broadcasting network. The digital television broadcast signal is used to transmit AV content such as programs and CM's (Commercial Message).

Also, the broadcasting apparatus 21 transmits trigger information serving as a command regarding the operation of an application program or programs used for data broadcasting (the application program may be called the data broadcast application hereunder) and operated in interlocked relation to the AV content, the trigger information being included in the digital television broadcast signal when transmitted. More specifically, the trigger information is placed in transport streams (TS's) of the digital television broadcast signal or embedded in a video and audio signal when transmitted.

In addition to information indicating a command type, the trigger information includes information indicating the source at which the data broadcast application is acquired. Details of the trigger information will be discussed later.

The server 22 supplies data broadcast applications in response to requests from the reception apparatus 23 or external apparatus 24 gaining access to the server 22 via the Internet 3.

The reception apparatus 23 receives the digital broadcast signal broadcast by the broadcasting apparatus 21, and outputs images and sounds of the AV content to a monitor (not shown). Also, the reception apparatus 23 accesses the server 22 via the Internet 3 to acquire and execute data broadcast applications.

Furthermore, the reception apparatus 23 is connected to the external apparatus 24 and sends commands to the latter for controlling the application program to be executed by the external apparatus 24.

The reception apparatus 23 may be implemented as an independent unit or incorporated in a television set or in a video recorder, for example.

The external apparatus 24 is connected to the reception apparatus 23 and executes an application program in accordance with commands transmitted from the reception apparatus 23. Also, in accordance with the operation of the application program, the external apparatus 24 transmits to the reception apparatus 23 the commands for controlling the operation of a data broadcast application to be executed by the reception apparatus 23.

For example, when not executing a specific application program interlocked to the reception apparatus 23 (the application may be called the specific interlocked application hereunder), the external apparatus 24 accesses the server 22 via the Internet 3 in response to commands from the reception apparatus 23, and acquires and executes the data broadcast application. And when executing the specific interlocked application, the external apparatus 24 performs a specific process in response to commands from the reception apparatus 23. For example, the specific process may involve displaying information related to the AV content such as programs, the information being acquired from the server 22 (the information may be called the program-related information hereunder).

Incidentally, typical specific interlocked applications may include an application program for implementing the function of a remote controller for operating the reception apparatus 23, and an application program for implementing the function of an electronic program guide (EPG) for selecting programs. Also, a smart phone, a portable information terminal, a digital television set, a video recorder or the like may typically serve as the external apparatus 24.

The broadcasting system 1 is structured as described above.

[Typical Structure of Broadcasting Apparatus]

Figure 2:
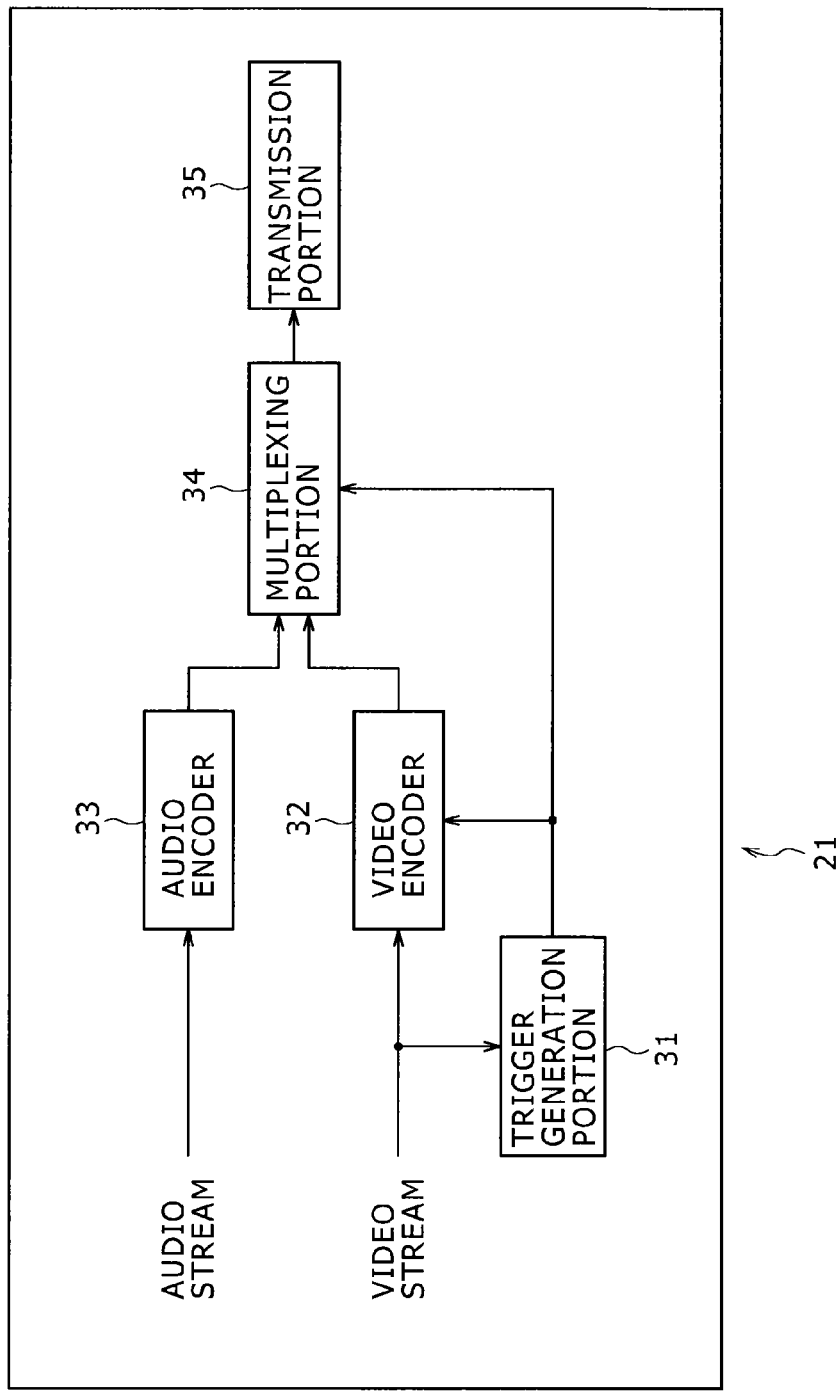
FIG. 2 is a schematic view showing a typical structure of a broadcasting apparatus.

FIG. 2 is a schematic view showing a typical structure of the broadcasting apparatus.

The broadcasting apparatus 21 is made up of a trigger generation portion 31, a video encoder 32, an audio encoder 33, a multiplexing portion 34, and a transmission portion 35.

The trigger generation portion 31 generates trigger information in keeping with the progress of a program or CM's input from the upstream portions, and outputs the generated trigger information to the video encoder 32 and multiplexing portion 34.

The video encoder 32 encodes the video stream of the AV content such as a program input form the upstream portions in accordance with a predetermined coding system, and supplies the resulting encoded video stream to the multiplexing portion 34. Typical coding systems that may be used by the video encoder 32 include MPEG-2 (Moving Picture Experts Group phase 2) and H.264.

Also, when encoding the video stream, the video encoder 32 embeds the trigger information from the trigger generation portion 31 into the stream to acquire an encoded video stream, and outputs the resulting encoded video stream to the multiplexing portion 34.

The audio encoder 33 encodes the audio stream corresponding to the video stream input to the video encoder 32, in accordance with a predetermined coding system to acquire an encoded audio stream, and feeds the resulting encoded audio stream to the multiplexing portion 34. Typical coding systems that may be used by the audio encoder 33 include AC3 (Audio Code number 3) and AAC (Advanced Audio Coding).

The multiplexing portion 34 is supplied with the encoded video stream from the video encoder 32, with the encoded audio stream from the audio encoder 33, and with the trigger information from the trigger generation portion 31.

The multiplexing portion 34 multiplexes the encoded video stream and encoded audio stream as well as the trigger information into a multiplexed stream that is fed to the transmission portion 35. For example, the video stream, audio stream and trigger information may be multiplexed into transport streams (TS). As another example, the video stream, audio stream and trigger information may be multiplexed in the ISO (International Standards Organization) base media file format (MP4) taking into consideration network distribution of digital television broadcasting.

The transmission portion 35 outputs the multiplexed stream coming from the multiplexing portion 34 as a digital television broadcast signal.

The broadcasting apparatus 21 is structured as explained above.

In the foregoing explanation, the trigger information was shown embedded into the video stream and also multiplexed into the multiplexed stream. Alternatively, the trigger information may be either embedded into the video stream or multiplexed into the multiplexed stream. As another alternative, the trigger information may be transmitted otherwise, e.g., embedded in the audio stream.

[Typical Structure of Reception Apparatus]

Figure 3:
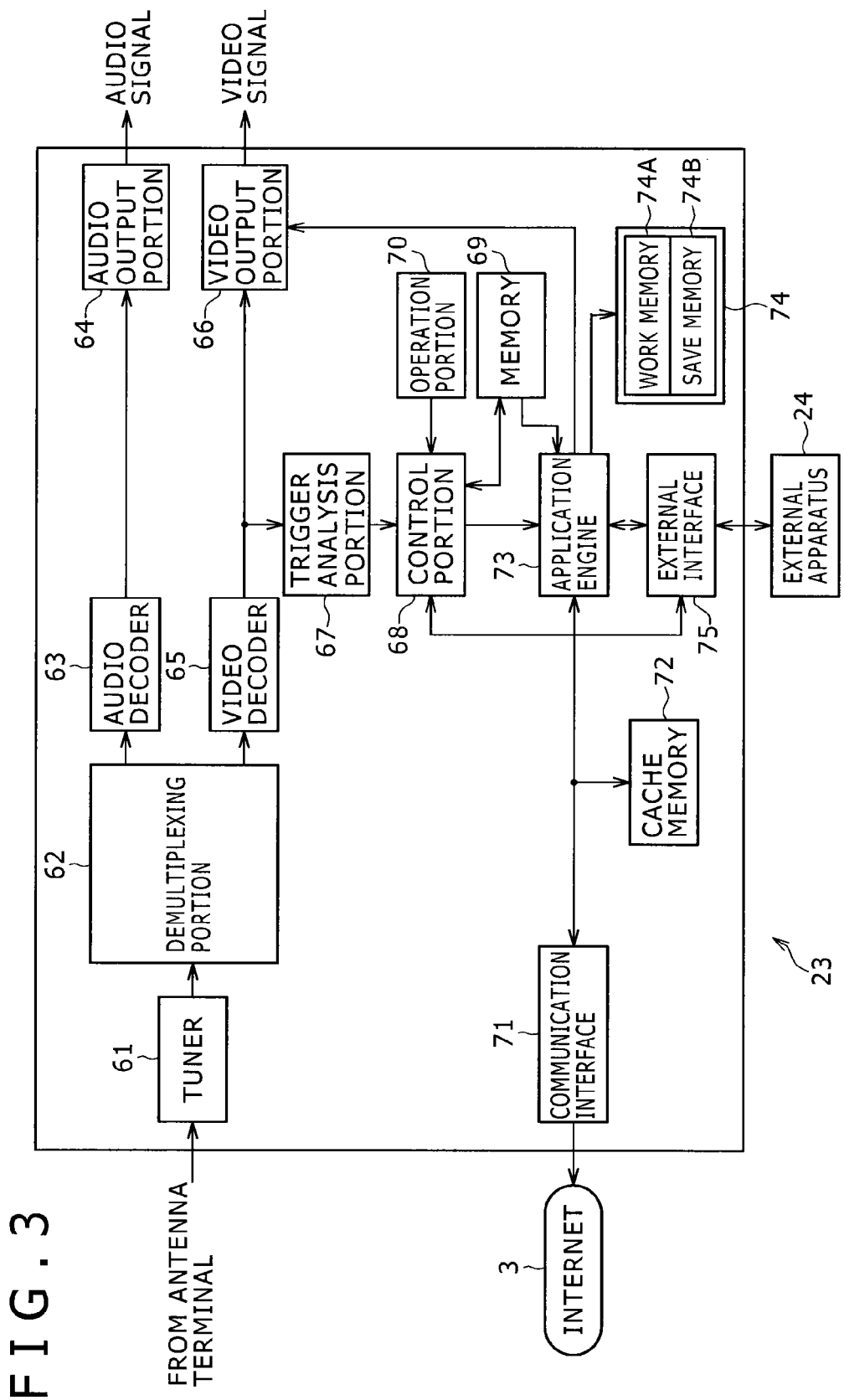
FIG. 3 is a schematic view showing a typical structure of a reception apparatus.

FIG. 3 is a schematic view showing a typical structure of the reception apparatus.

The reception apparatus 23 is made up of a tuner 61, a demultiplexing portion 62, an audio decoder 63, an audio output portion 64, a video decoder 65, a video output portion 66, a trigger analysis portion 67, a control portion 68, a memory 69, an operation portion 70, a communication I/F (Interface) 71, a cache memory 72, an application engine 73, an application memory 74, and an external I/F 75.

The tuner 61 receives and demodulates the digital television broadcast signal corresponding to the service selected by the user (i.e., channel), and feeds the multiplexed stream obtained through demodulation to the demultiplexing portion 62.

The demultiplexing portion 62 demultiplexes the multiplexed stream from the tuner 61 into an encoded audio signal and an encoded video signal, and supplies the encoded audio signal to the audio decoder 63 and the encoded video signal to the video decoder 65.

The audio decoder 63 decodes the encoded audio signal from the demultiplexing portion 62 into an audio signal, and feeds the resulting audio signal to the audio output portion 64.

The audio output portion 64 outputs the audio signal fed from the audio decoder 63 to a downstream portion such as speakers.

The video decoder 65 decodes the encoded video signal fed from the demultiplexing portion 62 into a video signal, and sends the resulting video signal to the video output portion 66 and trigger analysis portion 67.

The video output portion 66 outputs the video signal coming from the video decoder 65 to a downstream portion such as a display unit. Also, the audio output portion 66 combines the video signal from the video decoder 65 with the video signal of the data broadcast application from the application engine 73, and outputs the combined signal to a downstream portion.

The trigger analysis portion 67 continuously monitors the video signal supplied from the video decoder 65, and extracts trigger information that may be embedded in the video signal. The trigger analysis portion 67 analyzes the extracted trigger information and sends the result of the analysis to the control portion 68.

The control portion 68 controls the components of the reception apparatus 23 in operation by carrying out control programs recorded in the memory 69. Also, the control portion 68 is supplied with the result of the analyzed trigger information from the trigger analysis portion 67. In accordance with the command included in the trigger information, the control portion 68 controls the acquisition, registration, or activation of the data broadcast application, the injection of an event into the application, or the suspension or termination of the application.

The control programs and various kinds of information are recorded in the memory 69. The operation portion 70 accepts diverse operations performed by the user, and supplies the control portion 68 with operation signals corresponding to the user's operations.

The communication I/F 71 under control of the application engine 73 connects to the server 22 via the Internet 3. The application engine 73 under control of the control portion 68 acquires the data broadcast application from the server 22 via the communication I/F 71 and the Internet 3, and places the acquired application into the cache memory 72 for retention.

The application engine 73 under control of the control portion 68 reads the data broadcast application retained in the cache memory 72 and executes the retrieved application. The video signal of the currently executing data broadcast application is forwarded to the video output portion 66.

Furthermore, if the connected external apparatus 24 is targeted to be interlocked, the application engine 73 supplies the external I/F 75 with commands for controlling the application program to be executed by the external apparatus 24.

The external I/F 75 under control of the control portion 68 establishes wired or wireless connection with the external apparatus 24, and sends to the external apparatus 24 the commands supplied from the application engine 73. Also, the external I/F 75 receives commands which are sent from the external apparatus 24 and which control the data broadcast application, and feeds the received commands to the application engine 73. Incidentally, the external I/F 75 may be formed integrally with the communication I/F 71.

The application engine 73 controls the operation of the data broadcast application in accordance with the commands fed from the external I/F 75. As needed, the application engine 73 may acquire and process diverse kinds of information that are retained in the memory 69.

The application memory 74 is composed of a work memory 74A and a save memory 74B. The application engine 73 records to the work memory 74A the data about the currently executing data broadcast application (specifically, the data may include the layer of the currently displayed information). When suspending the currently executing data broadcast application, the application engine 73 moves the data held in the work memory 74A of the application memory 74 into the save memory 74B. And when reactivating the suspended data broadcast application, the application engine 73 moves the data held in the save memory 74B into the work memory 74A so as to restore the state before the suspension.

The reception apparatus 23 is structured as explained above.

[Typical Structure of External Apparatus]

FIG. 4 is a schematic view showing a typical structure of the external apparatus.

The external apparatus 24 is made up of an external I/F 91, a command analysis portion 92, a control portion 93, an operation portion 94, a memory 95, an application engine 96, a communication I/F 97, and a display portion 98.

The external I/F 91 under control of the control portion 93 establishes wired or wireless connection with the reception apparatus 23 and receives commands transmitted from the reception apparatus 23. The external I/F 91 feeds the received commands to the command analysis portion 92.

The command analysis portion 92 analyzes the command fed from the external I/F 91, and supplies the result of the analysis to the control portion 93.

The control portion 93 controls the components of the external apparatus 24 in operation by carrying out control programs recorded in the memory 95. Also, in accordance with the commands fed from the command analysis portion 92, the control portion 93 controls the operation of the application program to be executed by the application engine 96.

The operation portion 94 accepts diverse operations performed by the user, and supplies the control portion 93 with operation signals corresponding to the user's operations.

The application engine 96 executes the application program under control of the control portion 93. The video signal of the application program is sent to the display portion 98.

For example, when not executing a specific interlocked application, the application engine 96 under control of the control portion 93 acquires the data broadcast application from the server 22 via the communication I/F 97 and the Internet 3 and activates the acquired application. And under control of the control portion 93, the application engine 96 executes the injection of an event into the currently executing data broadcast application, or the suspension or termination of the application.

Furthermore, when executing the specific interlocked application, the application engine 96 under control of the control portion 93 acquires program-related information from the server 22 via the communication I/F 97 and the Internet 3 and feeds the acquired information to the display portion 98.

The communication I/F 97 under control of the application engine 96 connects to the server 22 via the Internet 3, and acquires the data broadcast application or program-related information from the server 22. Incidentally, the communication I/F 97 may be formed integrally with the external I/F 91.

The display portion 98 displays images corresponding to the video signal supplied from the application engine 96. The sounds corresponding to the audio signal are output from speakers (not shown).

In keeping with the operation of the currently executing application program, the application engine 96 transmits to the external I/F 91 the commands for controlling the data broadcast application to be executed by the reception apparatus 23. The external I/F 91 forwards the commands from the application engine 96 to the reception apparatus 23.

The external apparatus 24 is structured as explained above.
[Details of Trigger Information]
Trigger information will now be explained in detail. The trigger information is used to control the data broadcast application. For example, the trigger information may include a register command, an execute command, an inject event command, a suspend command, and a terminate command.

FIG. 5 shows the items included in the trigger information serving as the register command. The register command is a command that instructs the reception apparatus 23 to acquire and register the data broadcast application.

"Trigger_id" gives information identifying this trigger information. If the trigger information of the same content is transmitted a plurality of times, the "Trigger_id" item of each trigger information is the same.

"Protocol_version" indicates the Protocol version of this trigger information. "Command_code" indicates the command type of this trigger information. In the example of FIG. 5, the "Command_code" item describes information indicative of the register command.

"Trigger_validity" gives a server access dispersion parameter value indicating the probability that each reception apparatus 23 having received this trigger information will perform processes in accordance with the received trigger information.

"App_id" gives information identifying the data broadcast application acquired in correspondence with this trigger information. Also, "App_id" indicates the URL (Uniform Resource Locator) of the destination (i.e., server 22) from which to acquire the data broadcast application in correspondence with this trigger information.

"App_type" gives information indicating the type of the data broadcast application (e.g., HTML5, java) corresponding to this trigger information. "App_life_span" gives information indicating the scope of operation of the data broadcast application.

"Persistent_priority" indicates the priority for the relevant data broadcast application to be acquired and retained. "Expire_date" gives information indicating the expiration date of the data broadcast application. When the data broadcast application is registered, the relevant priority (Persistent_priority) and expiration date (Expire_date) are stored. The data broadcast application is then managed in accordance with the priority and expiration date.

FIG. 6 shows the items included in the trigger information serving as the execute command. The execute command is a command that instructs the reception apparatus 23 to activate the data broadcast application.

The items "Trigger_id," "Protocol_version," "Command_code," "Trigger_validity," "App_id," "App_type," and "Expire_date" are the same as those included in the trigger information serving as the register command and shown in FIG. 5. However, it should be noted that "Command_code" describes information indicative of the execute command. "TDO_life_scope" is an information item that indicates the scope of operation of the data broadcast application.

FIG. 7 shows the items included in the trigger information serving as the inject event (Inject event) command. The inject event command is a command that instructs the reception apparatus 23 to inject an event into the currently executing data broadcast application.

The items "Trigger_id," "Protocol_version," "Command_code," "Trigger_validity," "App_id," and "App_type" are the same as those included in the trigger information serving as the register command and shown in FIG. 5. However, it should be noted that "Command_code" describes information indicative of the inject event command.

"Event_id" gives information identifying the event to be injected into the data broadcast application designated by "App_id." "Event Embedded Data" describes the data to be referenced when the event is injected.

FIG. 8 shows the items included in the trigger information serving as the suspend command. The suspend command is a command that instructs the reception apparatus 23 to suspend the currently executing data broadcast application.

The items "Trigger_id," "Protocol_version," "Command_code," "Trigger_validity," and "App_id" are the same as those included in the trigger information serving as the register command and shown in FIG. 5. However, it should be noted that "Command_code" describes information indicative of the suspend command.

FIG. 9 shows the items included in the trigger information serving as the terminate command. The terminate command is a command that instructs the reception apparatus 23 to terminate the currently executing data broadcast application.

The items "Trigger_id," "Protocol_version," "Command_code," "Trigger_validity," and "App_id" are the same as those included in the trigger information serving as the register command and shown in FIG. 5. However, it should be noted that "Command_code" describes information indicative of the terminate command.

FIG. 10 shows a typical trigger information syntax that can correspond to any one of the above-described commands. The syntax of the trigger information may be devised as desired and is not limited to the example indicated in FIG. 10.

[State Transitions of Data Broadcast Application]

FIG. 11 is a state transition diagram of the data broadcast application operating in accordance with the trigger information serving as any one of the register command, execute command, inject event command, suspend command, and terminate command.

As shown in FIG. 11, the state of the data broadcast application may be defined as one of four states: released state, ready state, active state, and suspended state among which transitions are to be made.

The released state is a state in which the data broadcast application has yet to be acquired by the reception apparatus 23. The ready state is a state in which the data broadcast application is already registered with the reception apparatus 23 but has yet to be activated thereby. The active state is a state where the data broadcast application has been activated and is currently executed. The suspended state is a state where the execution of the data broadcast application is suspended and information indicative of the suspended state is retained in the save memory 74B.

Figure 12:
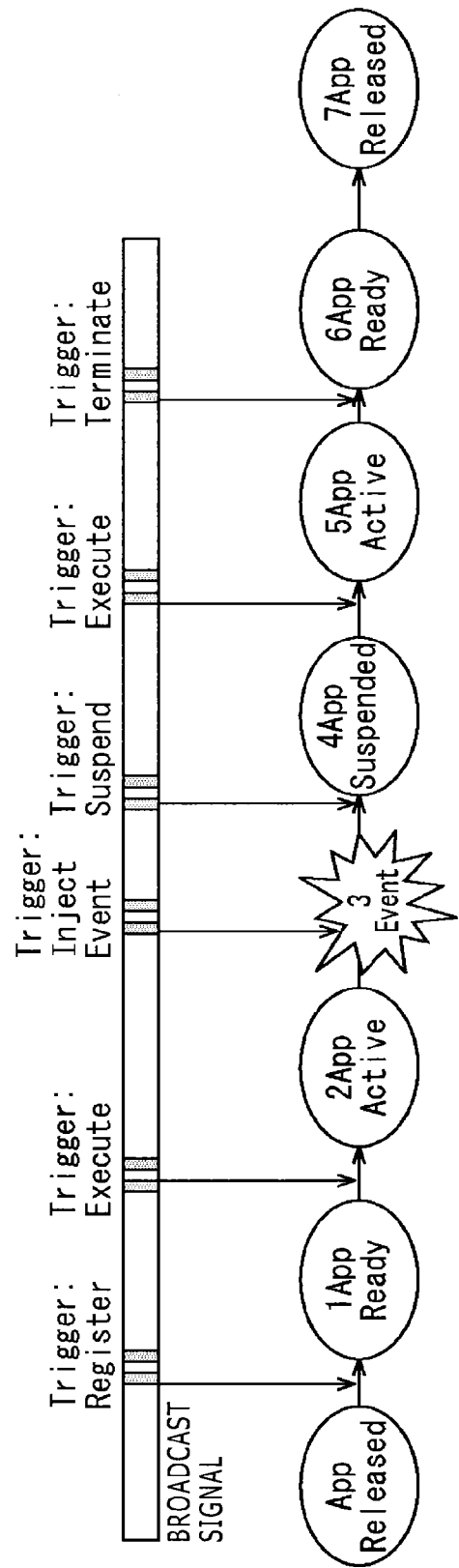
FIG. 12 is a state transition diagram for commands in conjunction with the data broadcast application.

FIG. 12 shows typical state transitions between commands and the data broadcast application.

When in the released state (i.e., yet to be acquired by the reception apparatus 23), the data broadcast application is acquired and retained in response to the trigger information of the register command. After being registered, the data broadcast application transitions to the ready state.

When in the ready state, the data broadcast application is activated in response to the trigger information of the execute command. Thus activated, the data broadcast application transitions to the active state.

When in the released state (i.e., yet to be acquired by the reception apparatus 23), the data broadcast application is acquired and registered in response to the trigger information of the execute command. After being activated, the data broadcast application transitions to the activate state. Furthermore, when in the activate state, the currently executing data broadcast application undergoes the injection of an event in response to the trigger information of the inject event command. In this case, predetermined processes are carried out including one that reads updated data and has it reflected on the display.

When in the activate state, the currently executing data broadcast application is suspended in response to the trigger information of the suspend command. Thus suspended, the data broadcast application transitions to the suspended state. While in the suspended state, the data broadcast application transitions to the ready state in response to the trigger information of the terminate command.

When in the suspended state, the data broadcast application is reactivated in response to the trigger information of the execute command. Thus reactivated, the data broadcast application transitions to the active state. When in the activate state, the currently executing data broadcast application is terminated in response to the trigger information of the terminate command. After being terminated, the data broadcast application transitions to the ready state.

When in the ready state, activate state or suspended state, a given data broadcast application may surpass its expiration date. If that happens, the data broadcast application in question is deleted from the cache memory 72 and its registration is cancelled. The data broadcast application then transitions to the released state.

[Outline of Data Broadcast Applications being Interlocked to One Another]

Figure 13:
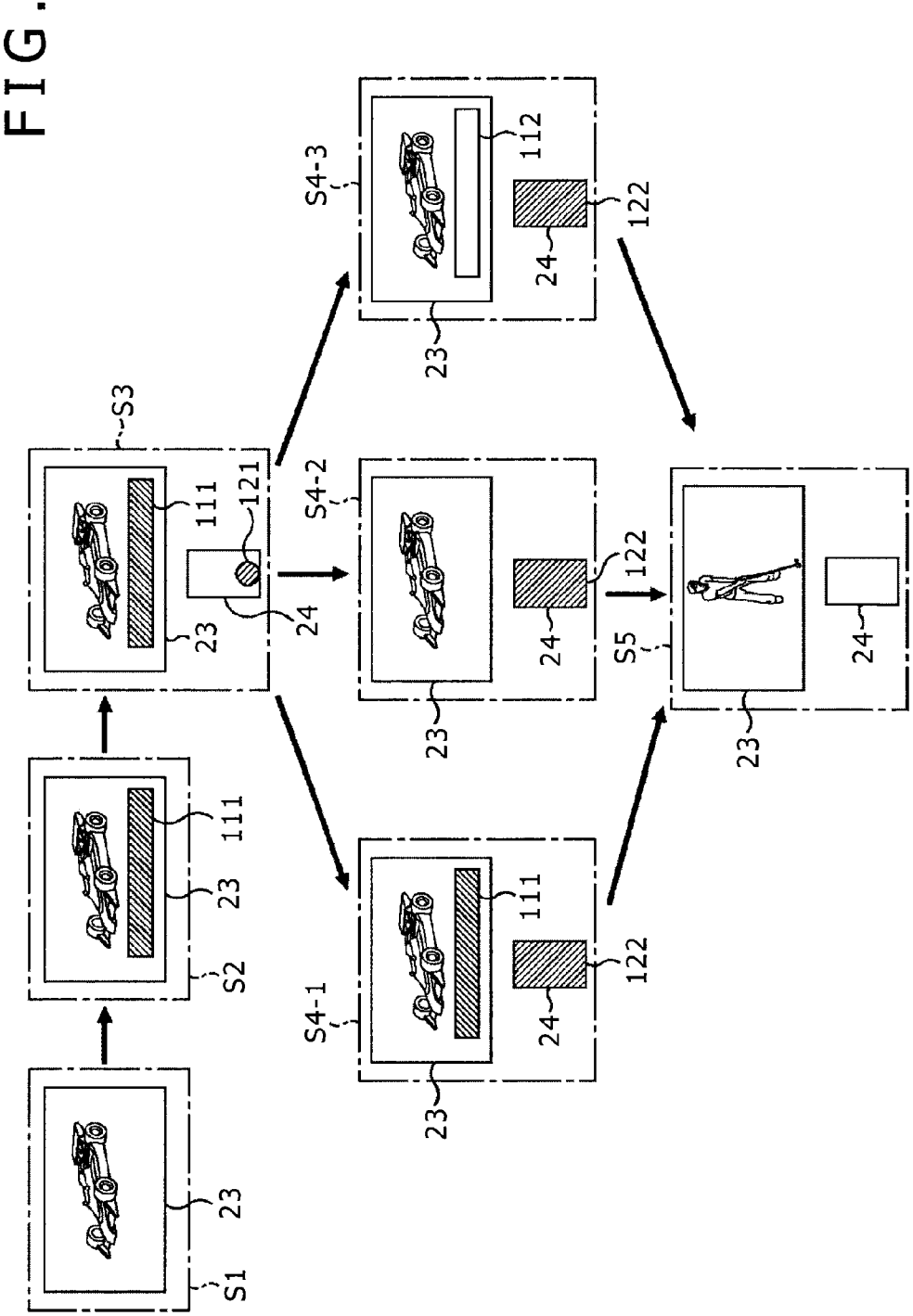
FIG. 13 is a schematic view outlining how data broadcast applications are interlocked to one another.
Figure 14:
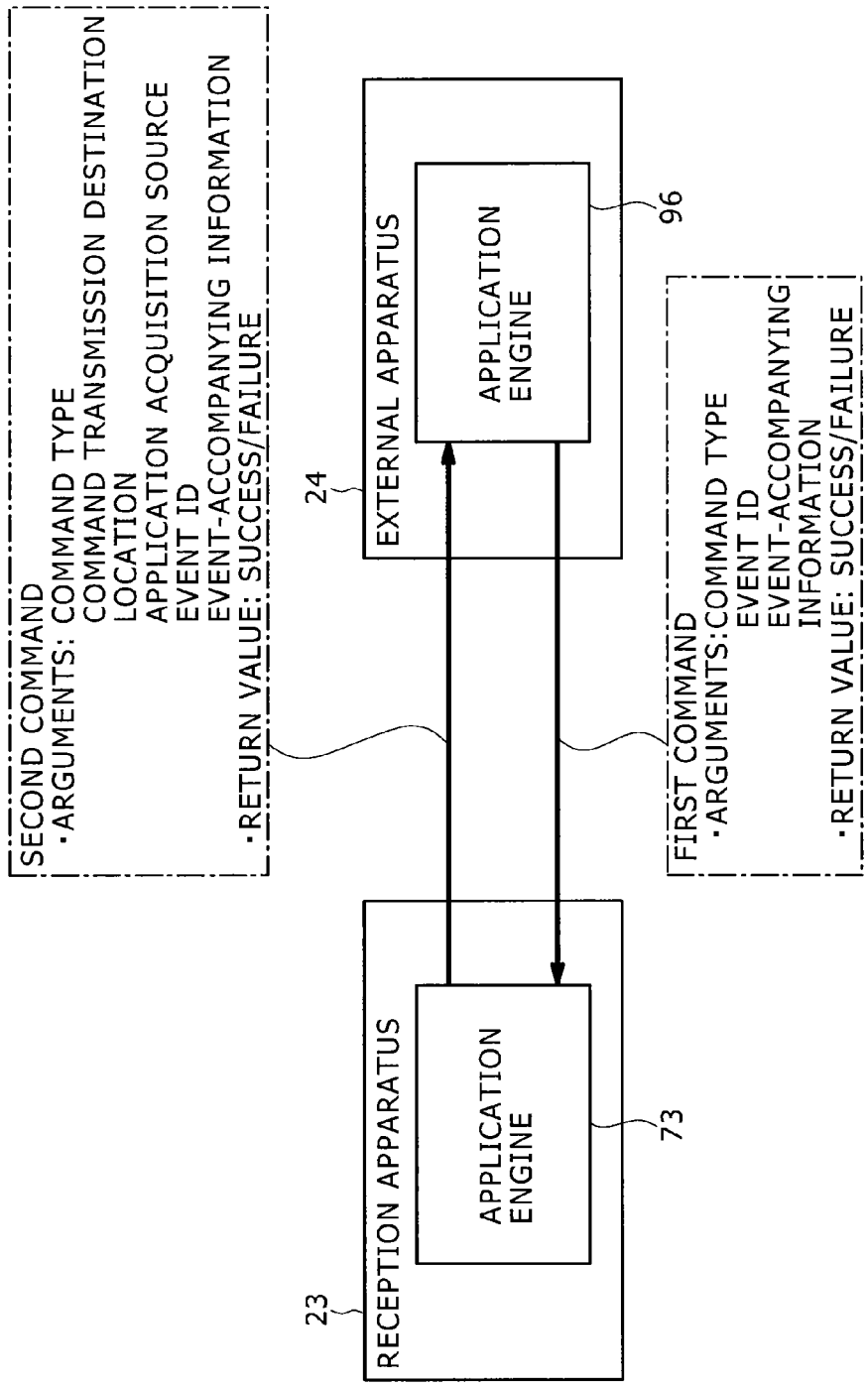
FIG. 14 is a schematic view showing details of commands.

Outlined below in reference to FIGS. 13 and 14 is how the data broadcast applications of the reception apparatus 23 and external apparatus 24 are typically interlocked to one another.

In the ensuing explanation, the data broadcast application executed by the reception apparatus 23 will be referred to as "the first broadcast application" in order to distinguish from the data broadcast application executed by the external apparatus 24, the latter application being called "the second broadcast application." It should be noted that the first and the second data broadcast applications may be the same application or different applications.

Further in the ensuing explanation to distinguish commands for controlling the first data broadcast application, the second data broadcast application, and the specific interlocked application, the command executed by the reception apparatus 23 to control the operation of the first data broadcast application also executed by the reception apparatus 23 will be referred to as "the first command" in order to distinguish from the command executed by the external apparatus 24 to control the operation of the second data broadcast application or of the specific interlocked application executed by the external apparatus 24, the latter command being called "the second command."

As shown in FIG. 13, when the user selects a desired channel on the reception apparatus 23, an image of the program corresponding to the selected channel is displayed (S1). If trigger information transmitted along with AV content is received, the received trigger information is analyzed. In accordance with the first command designated by the trigger information, the first data broadcast application is executed, and program-interlocked information 111 interlocked to the program is displayed (S2).

Later, the external apparatus 24 may be connected to the reception apparatus 23 and targeted to be interlocked. In that case, the reception apparatus 23 transmits to the external apparatus 24 the second command for controlling the operation of the second data broadcast application. The second command causes the external apparatus 24 to give a pop-up display of an activation notification 121 indicating that the second data broadcast application may be activated (S3).

If the user performs an activation permission operation in response to the activation notification 121, the external apparatus 24 executes the second data broadcast application thereby displaying program-interlocked information 122 (S4-1 through S4-3).

At this point, the external apparatus 24 transmits to the reception apparatus 23 the first command for controlling the operation of the first data broadcast application. In response to the first command coming from the external apparatus 24, the reception apparatus 23 executes the first data broadcast application and transitions to one of display states S4-1 through S4-3 as shown.

That is, in response to the first command from the external apparatus 24, the reception apparatus 23 may continuously display the program-interlocked information 111 (S4-1), delete the display of the program-interlocked information 111 (S4-2), or display new program-interlocked information 112 following a display update (S4-3).

Later, the reception apparatus 23 may receive trigger information. In that case, in response to the first command designated by the trigger information, the reception apparatus 23 terminates the first data broadcast application (S5). Upon terminating the first data broadcast application, the reception apparatus 23 transmits the second command accordingly to the external apparatus 24. In response to the second command coming from the reception apparatus 23, the external apparatus 24 terminates the second data broadcast application (S5).

As explained above, the reception apparatus 23 and external apparatus 24 interlock their data broadcast applications by having commands transmitted to each other, the command from one data broadcast application changing the operating state of the other data broadcast application. More specifically, as shown in FIG. 14, the application engine of the reception apparatus 23 and that of the external apparatus 24 exchange commands therebetween.

The application engine 73 executing the first data broadcast application on the reception apparatus 23 transmits the second command to the external apparatus 24. For example, the second command may be defined by a suitable function such as "SendCommand" provided by API (Application Program Interface). In this command, such arguments as a command type, a command transmission destination location, an application acquisition source, an event ID, and event-accompanying information may be designated for example.

The command type designates the type of the command in question. For example, this argument describes information indicative of the activation, termination, an event, or suspension of the second data broadcast application. The command transmission destination location describes information such as IP (Internet Protocol) and a URL regarding the external apparatus 24.

The application acquisition source describes information such as a URL indicating the source from which to acquire the second data broadcast application. This information is described only in the case of the activate command. In this context, the activate command is a command that activates the second data broadcast application.

The event ID gives information identifying the event to be injected into a specific interlocked application. The event-accompanying information describes the data (e.g., URL) to be referenced when the event is injected. The event ID and event-accompanying information are described only in the case of the event command. In this context, the event command is a command that injects an event into the specific interlocked application to perform specific processes such as one that displays program-related information.

Incidentally, when the reception apparatus 23 transmits the second command to the external apparatus 24, the external apparatus 24 sends back to the reception apparatus 23 a return value indicative of a success or failure of the result of execution of the second command.

On the external apparatus 24, the application engine 96 executing the second data broadcast application or specific interlocked program transmits the first command to the reception apparatus 23. For example, the first command may be defined by a suitable function such as "SendCommand" provided by API. In this command, such arguments as a command type, an event ID, and event addition information may be designated for example.

The command type designates the type of the command in question. This argument describes information indicative of an event of the first data broadcast application.

The event ID gives information identifying the event to be injected into the first data broadcast application. The event-accompanying information describes the data to be referenced when the event is injected.

Incidentally, when the external apparatus 24 transmits the first command to the reception apparatus 23, the reception apparatus 23 sends back to the external apparatus 24 a return value indicative of a success or failure of the result of execution of the first command.

Also, if the data broadcast applications executed by each application engine are described in, say, HTML (HyperText Markup Language), the above commands are transmitted by carrying out the POST method of HTTP (HyperText Transfer Protocol).

Explained above with regard to the example of FIG. 13 was the case where the second data broadcast application is activated by the second command on condition that the second data broadcast application is not active on the external apparatus 24. However, it is also possible to conceive a case where a specific interlocked program is already executed by the external apparatus 24. Thus the former case will be referred to as "use case 1" and the latter case as "use case 2" in the ensuing description, and the two cases will be explained hereunder.

[Operation Scenarios]

Figure 15:
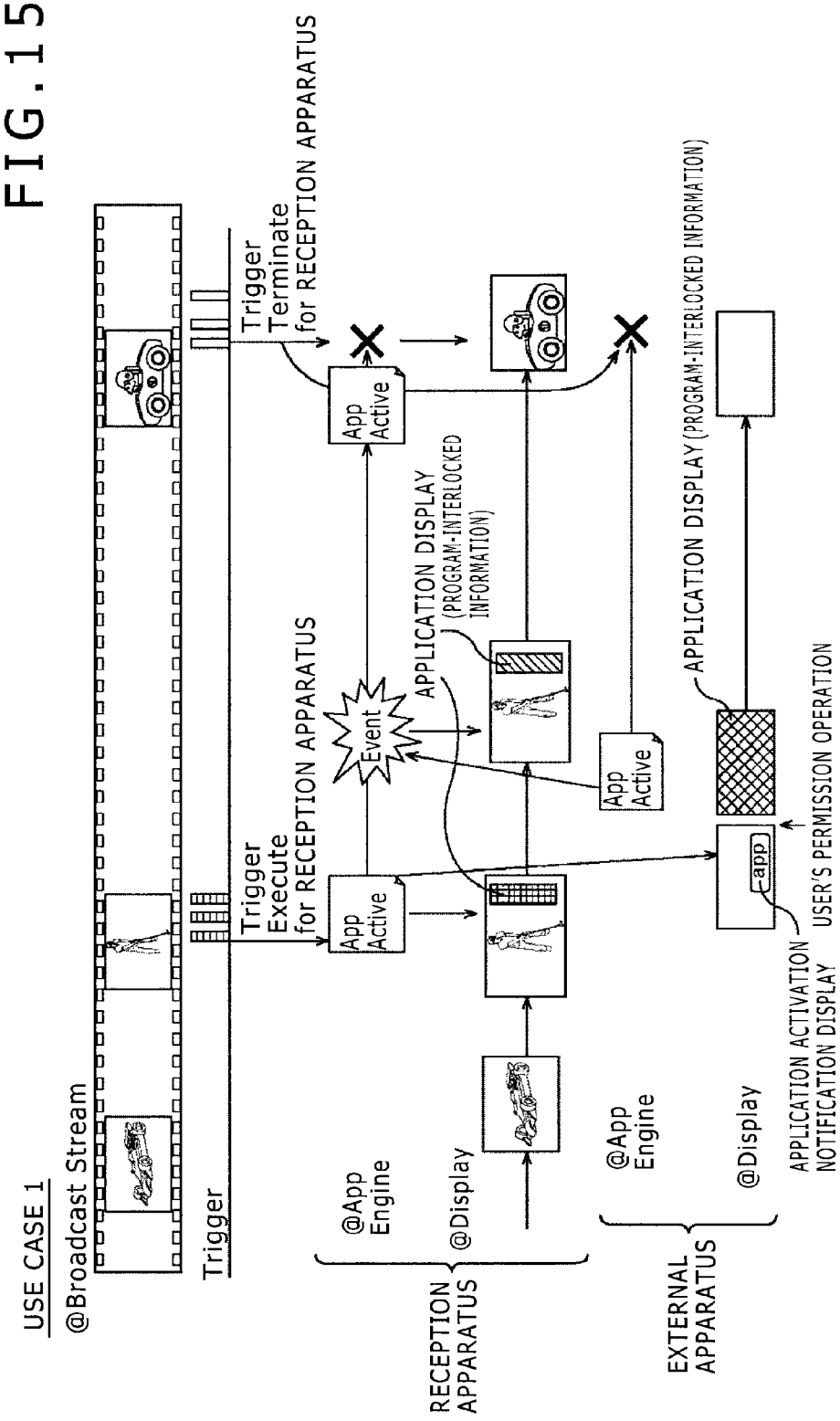
FIG. 15 is a schematic view showing a typical operation scenario.
Figure 16:
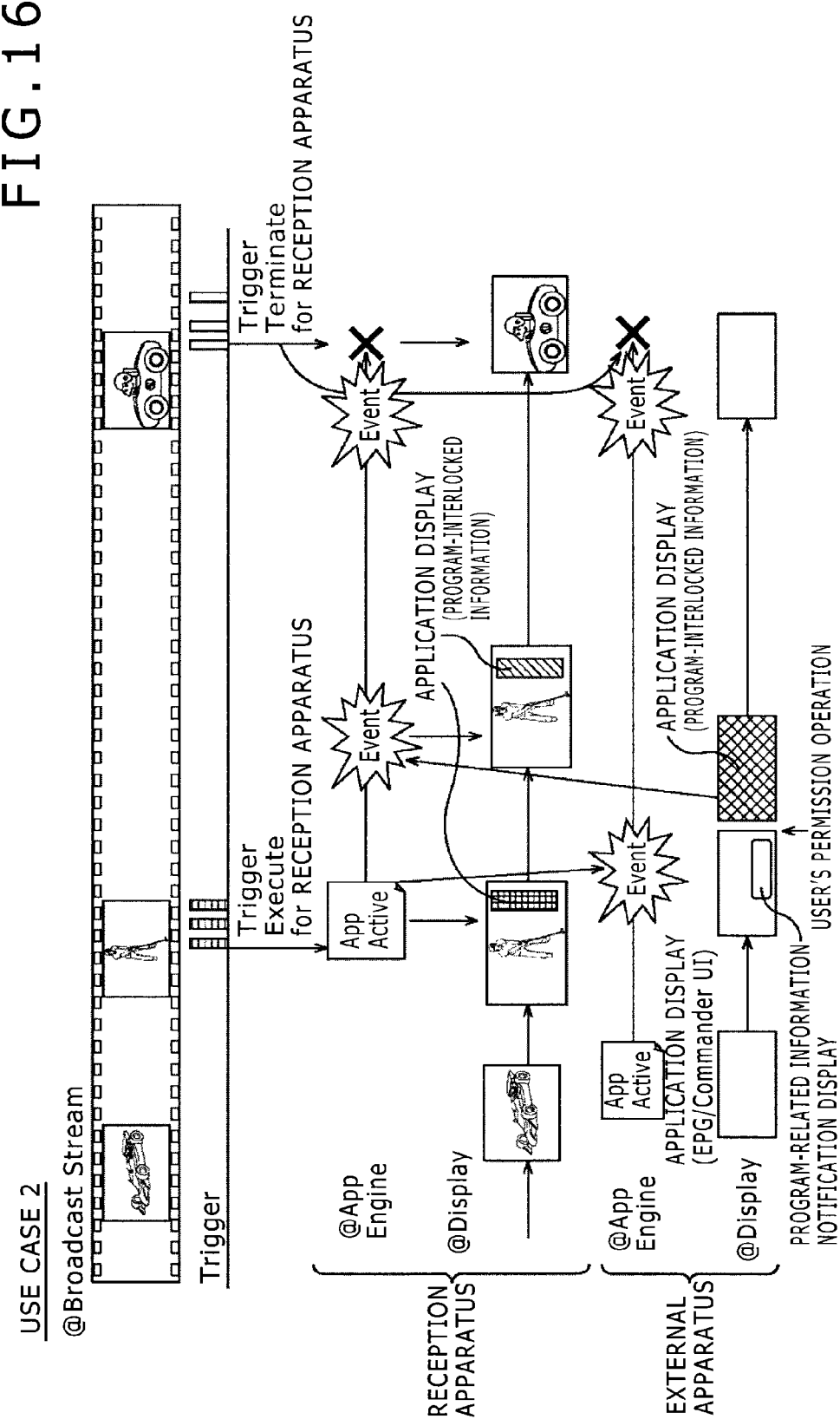
FIG. 16 is a schematic view showing another typical operation scenario.

When the reception apparatus 23 and external apparatus 24 transmit commands to each other to change the operating state of each other's application program as explained above, it becomes possible to operate the data broadcast applications as illustrated in FIGS. 15 and 16, for example.

FIG. 15 shows a typical operation scenario of use case 1.

In keeping with the progress of a program (i.e., AV content), the broadcasting apparatus 21 may transmit to the reception apparatus 23 the trigger information serving as the execute command for the first data broadcast application corresponding to the ongoing program. Upon receipt of the trigger information, the reception apparatus 23 activates the first data broadcast application. The activation causes an image of the first data broadcast application (program-interlocked information) to appear superposed on the image of the program.

If the first data broadcast application has yet to be acquired, the reception apparatus 23 acquires the first data broadcast application from the server 22 and activates the acquired application. At this point, it is assumed that no specific interlock application is being performed by the external apparatus 24.

The external apparatus 24 may also be connected to the reception apparatus 23 and targeted to be interlocked. In this case, the reception apparatus 23 may transmit the activate command (second command) to the external apparatus 24. Upon receipt of the activate command, the external apparatus 24 gives a pop-up display of an activation notification indicating that the second data broadcast application may be activated. If the user performs an activation permission operation upon verifying the application activation notification, the external apparatus 24 activates the second data broadcast application to display its image (program-interlocked information) while transmitting the event command (first command) to the reception apparatus 23 at the same time.

In response to the event command sent from the external apparatus 24, the reception apparatus 23 injects an event into the first data broadcast application being executed, thereby performing predetermined processes such as one that reads updated data and has it reflected on the display. The processing causes the reception apparatus 23 to transition to one of the states S4-1 through S4-3 shown in FIG. 13, for example.

Later, the reception apparatus 23 and external apparatus 24 continuously display the images of their data broadcast applications (program-interlocked information). At the end of the program, the broadcasting apparatus 21 may transmit to the reception apparatus 23 the trigger information serving as the terminate command for terminating the first data broadcast application being executed. Upon receipt of the trigger information, the reception apparatus 23 terminates the currently executing first data broadcast application. Also, the reception apparatus 23 transmits the terminate command (second command) to the external apparatus 24. The terminate command is a command that terminates the second data broadcast application.

Upon receipt of the terminate command sent from the reception apparatus 23, the external apparatus 24 terminates the currently executing second data broadcast application. The external apparatus 24 then returns to the display state before the second data broadcast application was activated.

In use case 1, as explained above, the external apparatus 24 controls the operation of the second data broadcast application in response to the second command from the reception apparatus 24. On the other hand, the reception apparatus 23 controls the operation of the first data broadcast application in keeping with the first command from the external apparatus 24.

FIG. 16 is a schematic view showing a typical operation scenario of use case 2.

As in the case of FIG. 15, when the broadcasting apparatus 21 transmits the trigger information of the execute command to the reception apparatus 23, the reception apparatus 23 activates the first data broadcast application. At this point, the external apparatus 24 is assumed to be executing a specific interlocked application.

Then after the external apparatus 24 is connected to the reception apparatus 23 and targeted to be interlocked, the reception apparatus 23 may transmit the event command (second command) to the external apparatus 24. Upon receipt of the event command, the external apparatus 24 gives a pop-up display of a program-related information notification. If the user performs a display permission operation upon verifying the program-related information notification, the external apparatus 24 displays program-related information while transmitting the event command (first command) to the reception apparatus 23 at the same time.

Upon receiving the event command sent from the external apparatus 24, the reception apparatus 23 injects an event into the currently executing first data broadcast application. For example, the reception apparatus 23 may transition to one of the states S4-1 through S4-3 shown in FIG. 13.

Later, the reception apparatus 23 and external apparatus 24 continuously display the images of their data broadcast applications (program-interlocked information and program-related information). At the end of the program, the broadcasting apparatus 21 may transmit to the reception apparatus 23 the trigger information serving as the terminate command for terminating the first data broadcast application being executed. Upon receipt of the trigger information, the reception apparatus 23 terminates the currently executing first data broadcast application. Also, the reception apparatus 23 transmits the event command (second command) to the external apparatus 24.

Upon receipt of the event command sent from the reception apparatus 23, the external apparatus 24 terminates the currently executing second data broadcast application, and returns to the state before the program-related information was displayed.

In use case 2, as explained above, the external apparatus 24 executing the specific interlocked application controls the display of the program-related information in response to the second command from the reception apparatus 23. On the other hand, the reception apparatus 23 controls the operation of the first data broadcast application in keeping with the first command from the external apparatus 24.

[Operation Sequences]

Figure 17:
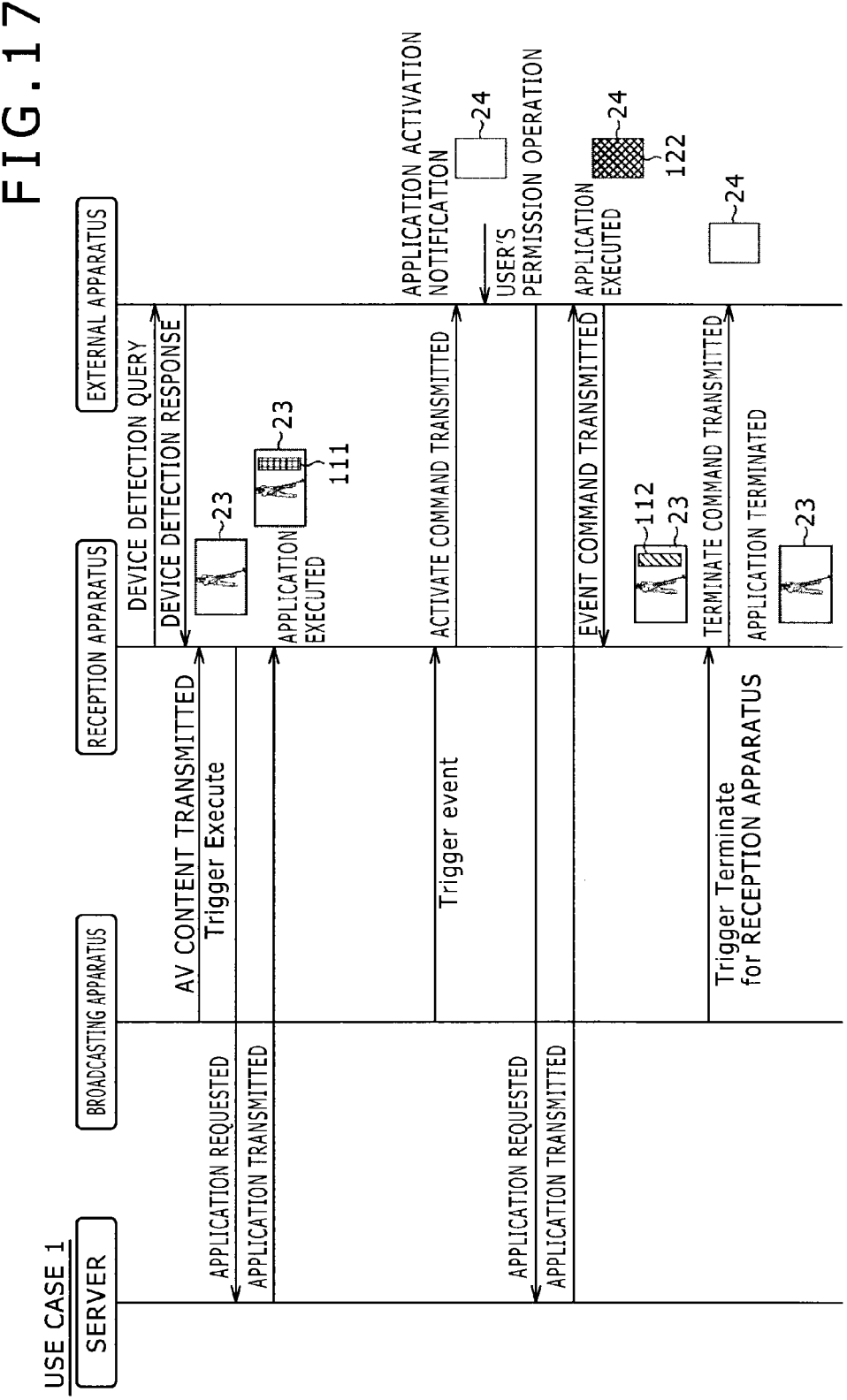
FIG. 17 is a schematic view showing a typical operation sequence.
Figure 18:
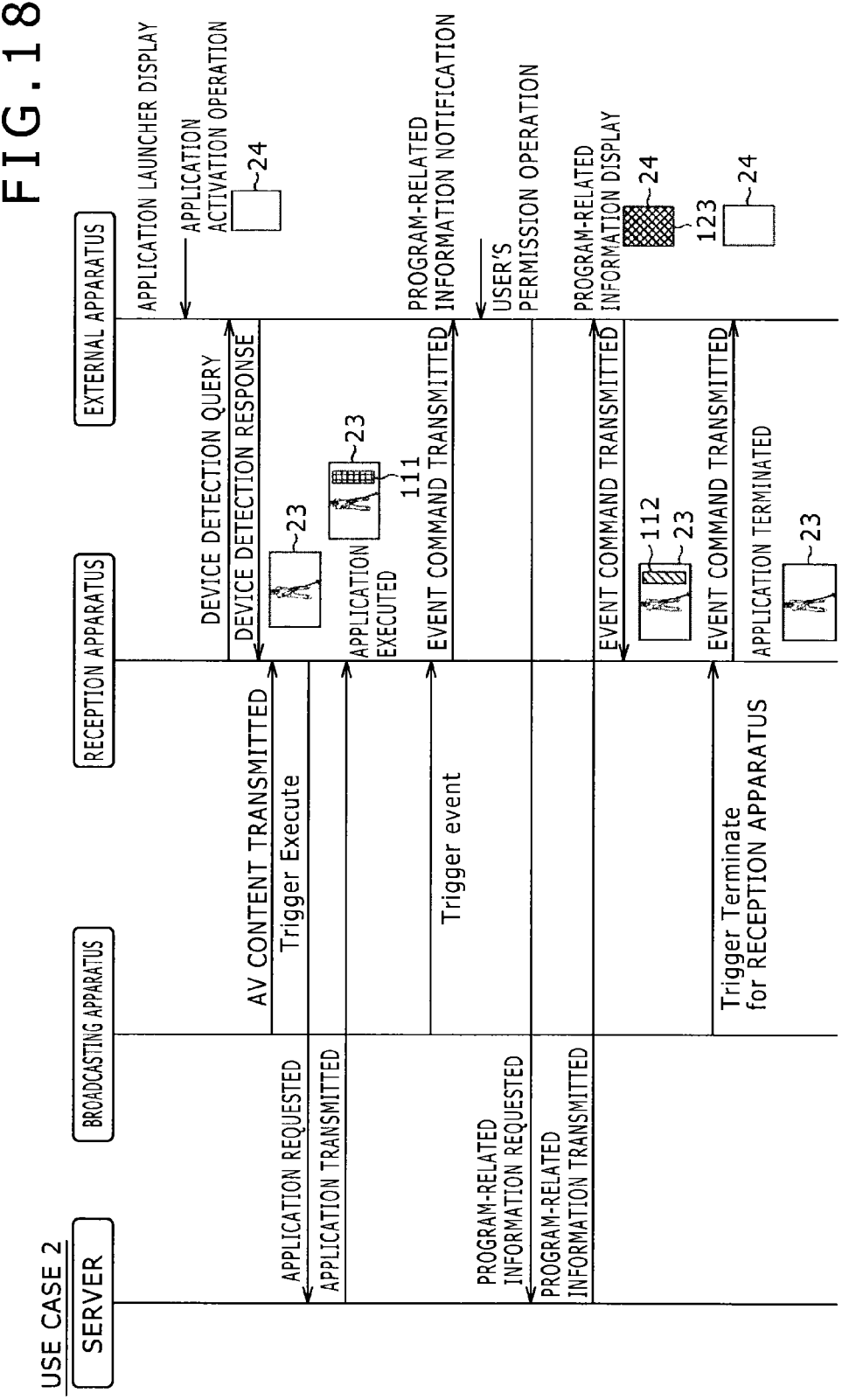
FIG. 18 is a schematic view showing another typical operation sequence.

Explained below in reference to FIGS. 17 and 18 is how the apparatuses making up the broadcasting system 1 operate in the operating scenarios of use cases 1 and 2 discussed above.

FIG. 17 is a schematic view showing a typical operation sequence of use case 1.

The reception apparatus 23 transmits a device detection query notification to the external apparatus 24 so as to detect the connected apparatus 24. In response to the notification, the reception apparatus 23 determines whether a device detection response is sent from the external apparatus 24.

The reception apparatus 23 may receive the trigger information of the execute command sent from the broadcasting apparatus 21 along with AV content. In this case, the reception apparatus 23 requests the first data broadcast application from the server 22 via the Internet 3. The reception 23 acquires the first data broadcast application transmitted from the server 22 upon request, and executes the acquired application. This causes program-interlocked information 111 of the first data broadcast application to appear superposed on the image of the program.

Later, the reception apparatus 23 may receive the trigger information of the inject event command sent from the broadcasting apparatus 21. In this case, the reception apparatus 23 injects an event into the currently executing first data broadcast application, and transmits the activate command to the external apparatus 24.

Upon receipt of the activate command from the reception apparatus 23, the external apparatus 24 gives a pop-up display of an activation notification regarding the second data broadcast application. If the user performs an activation permission operation upon verifying the application activation notification, the external apparatus 24 requests the second data broadcast application from the server 22 via the Internet 3. The external apparatus 24 acquires the second data broadcast application transmitted from the server 22 upon request, and executes the acquired application. In this manner, the external apparatus 24 executes the second data broadcast application and displays program-interlocked information 122.

Then, after activating the second data broadcast application, the external apparatus 24 transmits the event command to the reception apparatus 23.

In response to the event command sent from the external apparatus 24, the reception apparatus 23 injects an event into the currently executing first data broadcast application. The operation entails such processes as one that reads updated data and has it reflected on the display. This causes the reception apparatus 23 to transition to one of the states S4-1 through S4-3 shown in FIG. 13, for example.

Later, the reception apparatus 23 may receive the trigger information of the terminate command from the broadcasting apparatus 21. In this case, the reception apparatus 23 terminates the currently executing first data broadcast application. Also, after terminating the first data broadcast application, the reception apparatus 23 transmits the terminate command to the external apparatus 24.

Upon receipt of the terminate command sent from the reception apparatus 23, the external apparatus 24 terminates the currently executing second data broadcast application, and returns to the state before the second data broadcast application was activated.

The above-described paragraph completes the explanation of the operation sequence of use case 1.

FIG. 18 is a schematic view showing a typical operation sequence of use case 2.

The external apparatus 24 is assumed to be displaying an application launcher for activating a specific interlocked application. The specific interlocked application is executed by an activation operation performed by the user.

The reception apparatus 23 detects the external apparatus 24 in the same manner as in use case 1 of FIG. 17. Also, upon receipt of the trigger information of the execute command from the broadcasting apparatus 21, the reception apparatus 23 acquires the first data broadcast application from the server 22 via the Internet 3, and executes the acquired application.

Later, upon receipt of the trigger information of the inject event command from the broadcasting apparatus 21, the reception apparatus 23 injects an event into the currently executing first data broadcast application, and transmits the event command to the external apparatus 24.

On receiving the event command from the reception apparatus 23, the external apparatus 24 gives a pop-up display of a program-related information notification. If the user performs a display permission operation upon verifying the program-related information notification, the external apparatus 24 requests the program-related information from the server 22 via the Internet 3. The external apparatus 24 acquires the program-related information transmitted from the server 22 upon request, and displays the acquired information. In this manner, the external apparatus 24 displays the program-related information 123.

Then, after displaying the program-related information, the external apparatus 24 transmits the event command to the reception apparatus 23.

In response to the event command sent from the external apparatus 24, the reception apparatus 23 injects an event into the currently executing first data broadcast application. The operation entails such processes as one that reads updated data and has it reflected on the display. This causes the reception apparatus 23 to transition to one of the states S4-1 through S4-3 shown in FIG. 13, for example.

Later, the reception apparatus 23 may receive the trigger information of the terminate command from the broadcasting apparatus 21. In this case, the reception apparatus 23 terminates the currently executing first data broadcast application. Also, after terminating the first data broadcast application, the reception apparatus 23 transmits the event command to the external apparatus 24.

Upon receipt of the event command sent from the reception apparatus 23, the external apparatus 24 terminates the display of the program-related information, and returns to the state before the program-related information was displayed.

The above-described paragraph completes the explanation of the operation sequence of use case 2.

In the above-described operation sequences of FIGS. 17 and 18, the reception apparatus 23 was shown transmitting the activate command and event command to the external apparatus 24 in accordance with the trigger information of the inject event command. The biggest difference between use case 1 and use case 2 is whether the external apparatus 24 is executing the specific interlocked application. Thus, although there exist some differences in the details of processing, FIGS. 15 and 17 indicate an example of use case 1 in which the specific interlocked application is not executed, whereas FIGS. 16 and 18 give an example of use case 2 in which the specific interlocked application is executed.

[Interlocked Operations of Reception Apparatus and External Apparatus]

Explained below in reference to the flowcharts of FIGS. 19 through 26 are typical interlocked operations performed by the reception apparatus 23 and external apparatus 24 in each of the above-mentioned use cases. The interlocked operations in use case 1 will be explained first in reference to the flowcharts of FIGS. 19 through 22, followed by an explanation of the interlocked operations in use case 2 in reference to the flowcharts of FIGS. 23 through 26.

When interlocked to each other, the reception apparatus 23 and external apparatus 24 each perform processes using a resident application program (called the resident process hereunder) in parallel with processes using an application program executed in interlocked relation to AV content (called the application process hereunder). In the description that follows, the resident process and application process of each apparatus will be explained separately.

[Interlocked Operations in Use Case 1]

First, the resident process performed by the reception apparatus 23 in use case 1 is explained below in reference to the flowchart of FIG. 19.

In step S101, the control portion 68 controls the external I/F 75 to transmit intermittently a device detection query notification. For example, if the external apparatus 24 is connected to the reception apparatus 23, the external apparatus 24 returns a device detection response. Incidentally, where the external apparatus 24 is to be detected, the communication system such as SSDP (Simple Service Discovery Protocol) defined by UPnP (Universal Plug and Play) may be used.

In step S102, the control portion 68 determines whether a device detection response is received from the external apparatus 24.

If in step S102 it is determined that the device detection response is received from the external apparatus 24, control is passed on to step S103. In step S103, the control portion 68 acquires the attributes of the external apparatus 24 and access destination information for connecting to the external apparatus 24, the attributes and the information (called the external apparatus information altogether) being included in the device detection response sent from the external apparatus 24. The control portion 68 stores what is acquired from the device detection response into the memory 69. For example, the attributes may include type information about the type of the external apparatus 24, and the access destination information may include such information as the IP address and URL of the external apparatus 24.

Upon completion of step S103, control is passed on to step S104. If in step S102 it is determined that no device detection response is received from the external apparatus 24, then step S103 is skipped and step S104 is reached.

In step S104, the control portion 68 determines whether trigger information is extracted based on the result of the trigger analysis portion 67 attempting to extract trigger information.

If in step S104 it is determined that no trigger information is extracted, control is returned to step S101 and the subsequent steps are repeated. If the device detection response is returned from the external apparatus 24, the external apparatus information about that external apparatus 24 is stored into the memory 69.

Later, if it is determined that trigger information is extracted in step S104, control is passed on to step S105. In step S105, the control portion 68 reads the item "Command_code" from the trigger information and determines whether the command designated by the trigger information is the execute command.

If in step S105 it is determined that the command is the execute command, control is passed on to step S106. In step S106, the application engine 73 activates the first data broadcast application under control of the control portion 68. Specifically, the application engine 73 controls the communication I/F 71 to acquire the data of the first data broadcast application identified by the application ID (App_id) from the server 22 via the Internet 3. After the acquisition, the application engine 73 activates and executes the first data broadcast application. Upon completion of step S106, control is returned to step S101 and the subsequent steps are repeated.

If in step S105 it is determined that the command is not the execute command, control is passed on to step S107. In step S107, based on the item "Command_code" of the trigger information, the control portion 68 determines whether the command designated by the trigger information is the terminate command.

If in step S107 it is determined that the command is not the terminate command, i.e., that the command is other than the execute command or the terminate command, control is passed on to step S108. In step S108, the application engine 73 performs the process corresponding to the command in question under control of the control portion 68. For example, if the trigger information of the suspend command is received, the currently executing first data broadcast application is suspended. Upon completion of step S108, control is returned to step S101 and the subsequent steps are repeated.

If in step S107 it is determined that the command is the terminate command, control is passed on to step S109. In step S109, the application engine 73 terminates the currently executing first data broadcast application under control of the control portion 68. Upon completion of step S109, control is returned to step S101 and the subsequent steps are repeated.

As explained above, by performing the resident process, the reception apparatus 23 continuously monitors the connection status of the external apparatus 24 as well as the status of trigger information extraction. If the external apparatus 24 is connected, the external apparatus information about the connected external apparatus 24 is stored. If trigger information is extracted, the process corresponding to the command designated by the trigger information is executed.

Figure 19:
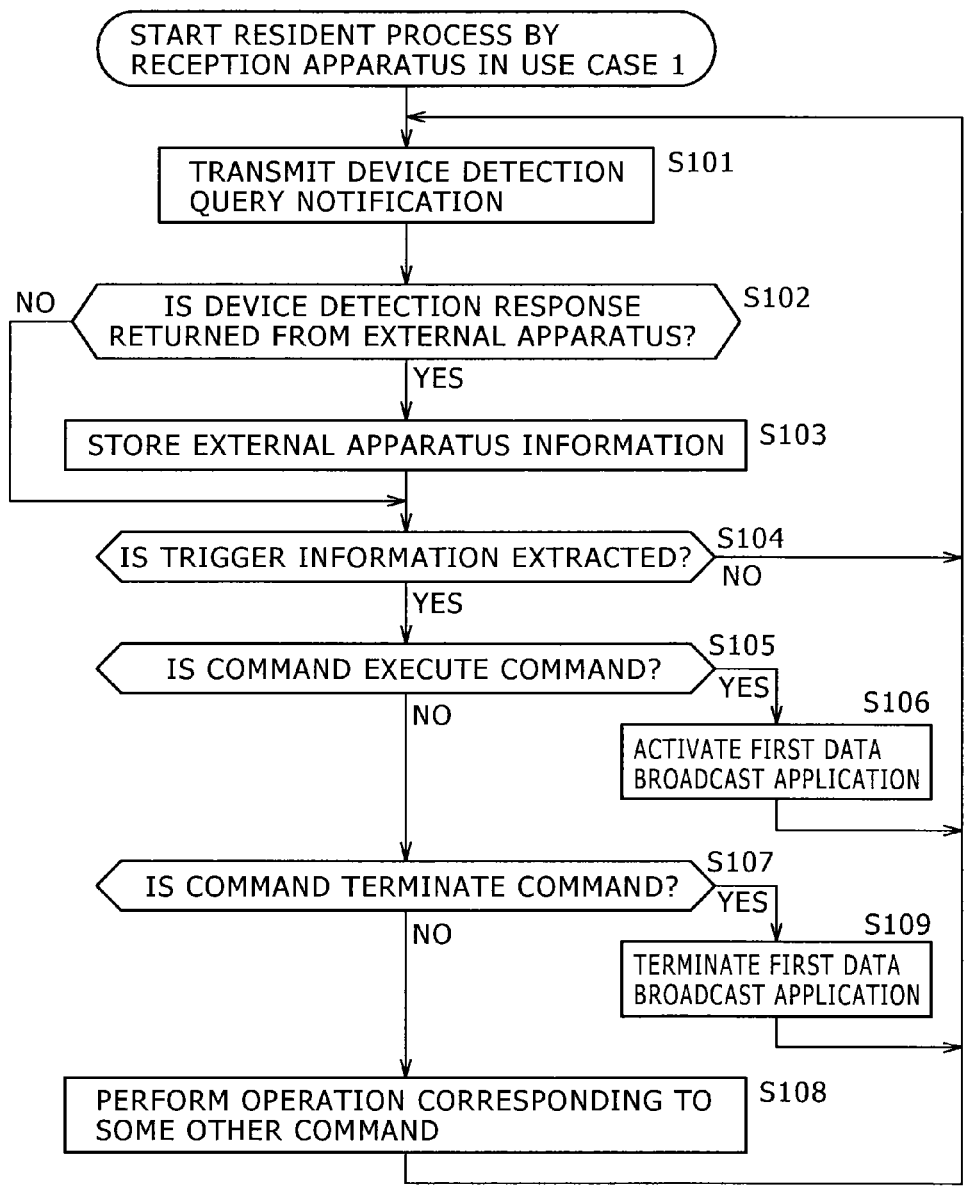
FIG. 19 is a flowchart explanatory of a resident process performed by the reception apparatus.
Figure 20:
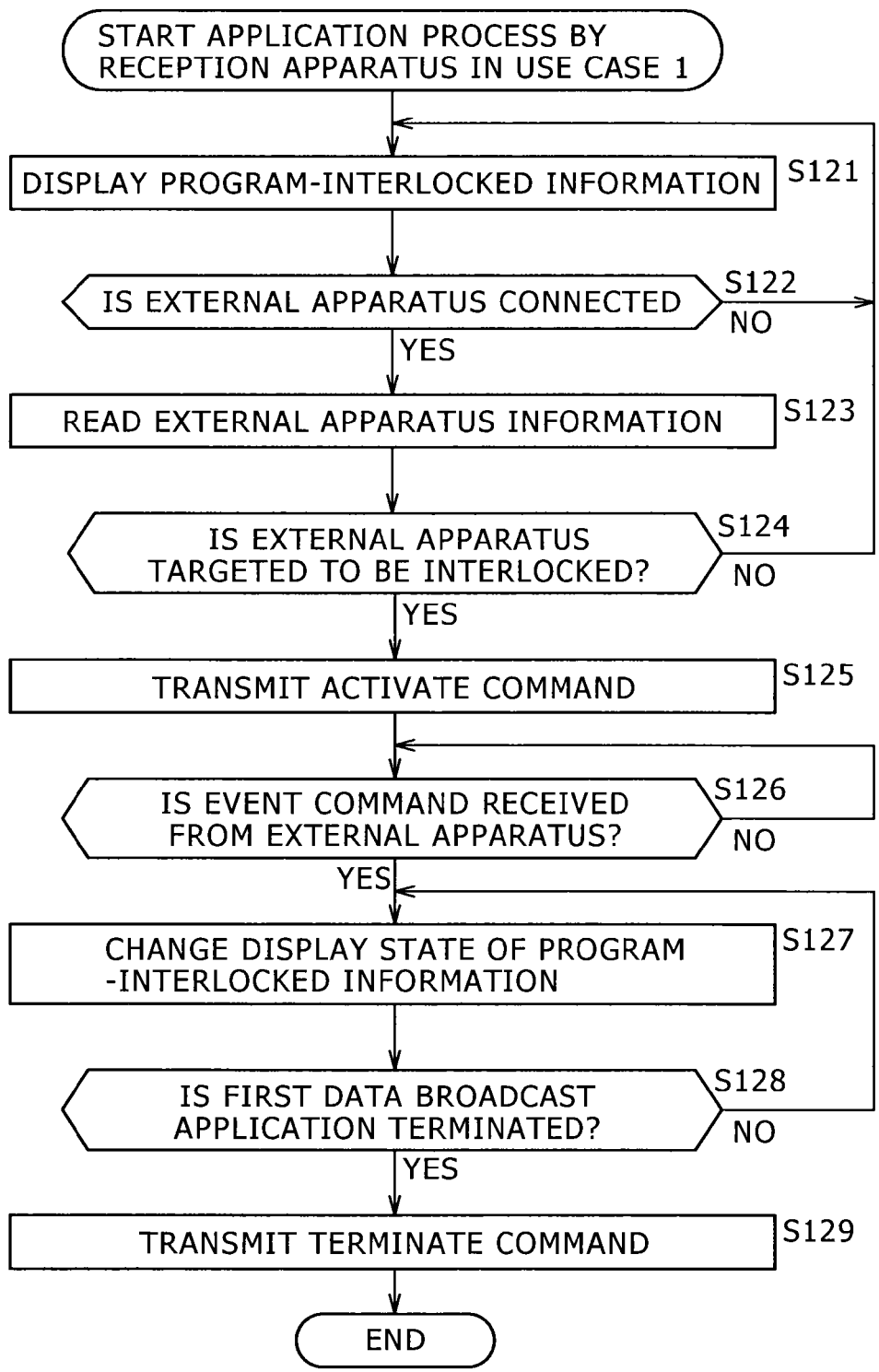
FIG. 20 is a flowchart explanatory of an application process performed by the reception apparatus.

Explained next in reference to the flowchart of FIG. 20 is the application process performed by the reception apparatus 23 in use case 1. The application process in FIG. 20 is carried out when the application engine 73 executes the first data broadcast application activated in step S106 of FIG. 19.

In step S121, the application engine 73 executes the first data broadcast application, thereby getting program-interlocked information displayed in superposed fashion on the image of the program.

In step S122, the application engine 73 controls the external I/F 75 to determine whether the external apparatus 24 is connected to the reception apparatus 23.

If in step S122 it is determined that the external apparatus 24 is connected, control is passed on to step S123. In step S123, the application engine 73 reads the external apparatus information that was stored into the memory 103 in step S103 of FIG. 19. Then, based on the retrieved external apparatus information, the application engine 73 determines whether the connected external apparatus 24 is targeted to be interlocked (in step S124). For example, the determination of whether or not the apparatus is to be interlocked may be accomplished by checking whether the type information about the type of the external apparatus 24, indicated by the attributes of the external apparatus 24 included in the external apparatus information, coincides with information about a predetermined specific type targeted to be interlocked.

If in step S124 it is determined that the connected external apparatus 24 is not targeted to be interlocked, control is returned to step S121 and the subsequent steps are repeated. Then the execution of the first data broadcast application is continued. Whenever a new external apparatus 24 is connected, it is determined whether the external apparatus 24 in question is targeted to be interlocked.

If in step S124 it is determined that the connected external apparatus 24 is targeted to be interlocked, control is passed on to step S125. In step S125, the application engine 73 controls the external I/F 75 to transmit the activate command to the external apparatus 24 targeted to be interlocked. Incidentally, the destination to which to transmit the activate command is specified by the access destination information associated with those attributes of the external apparatus 24 which are included in the external apparatus information retrieved from the memory 103.

In step S126, the application engine 73 controls the external I/F 75 to determine whether the event command is received from the external apparatus 24. The event command is transmitted when the external apparatus 24 activates the second data broadcast application in response to the activate command from the reception apparatus 23 (in step S149 of FIG. 21, to be discussed later).

If in step S126 it is determined that the event command is not received, then step S126 is repeated so as to iterate the process of determining whether or not the event command is received.

If in step S126 it is determined that the event command is received, control is passed on to step S127. In step S127, the application engine 73 changes the display state of the program-interlocked information in keeping with the received event command. Specifically, the program-interlocked information is changed to one of the states S4-1 through S4-3 shown in FIG. 13.

In step S128, the application engine 73 determines whether the first data broadcast application is terminated. If in step S128 it is determined that the first data broadcast application is not terminated, control is returned to step S127, and the display of the program-interlocked information is continued.

If the currently executing first data broadcast application is terminated in response to the terminate command in step S109 of FIG. 19, then it is determined that the first data broadcast application is terminated ("Yes" in step S128), and control is passed on to step S129. In step S129, the application engine 73 controls the external I/F 75 to transmit the terminate command to the external apparatus 24 targeted to be interlocked. Incidentally, the destination to which to transmit the terminate command is specified by the access destination information included in the external apparatus information, as in the case of the above-described activate command.

Upon completion of step S129, the application process in FIG. 20 performed by the reception apparatus 23 is terminated.

As explained above, by carrying out the application process, the reception apparatus 23 transmits the activate command and terminate command for activating and terminating the second data broadcast application. Concurrently, the reception apparatus 23 receives the event command sent from the external apparatus 24 and performs the process corresponding to the received event command.

Explained next is the processing performed by the external apparatus 24 targeted to be interlocked with the reception apparatus 23.

Figure 21:
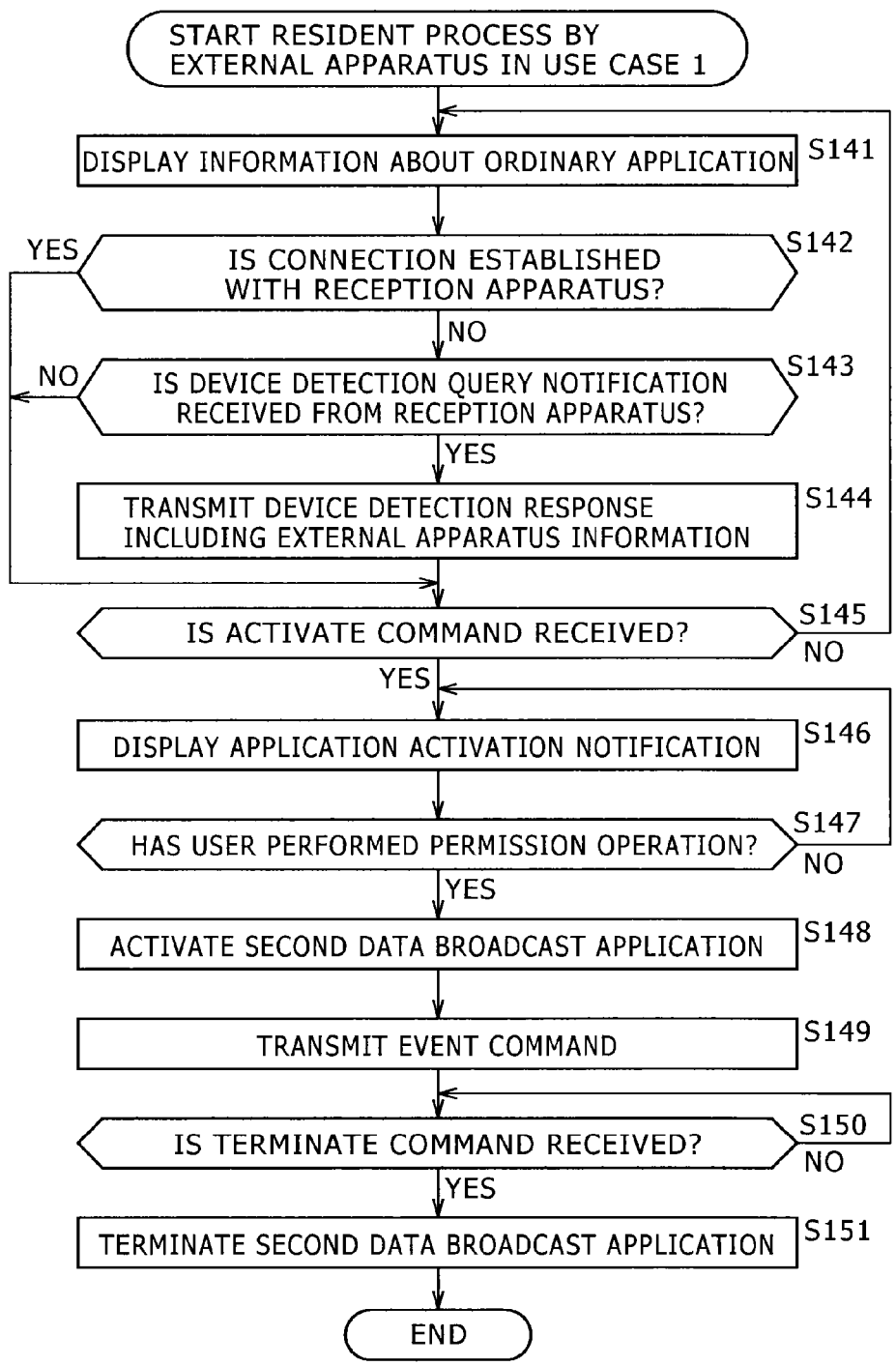
FIG. 21 is a flowchart explanatory of a resident process performed by the external apparatus.

Described below in reference to the flowchart of FIG. 21 is the resident process carried out by the external apparatus 24 in use case 1.

In step S141, the application engine 96 executes an application program as part of its ordinary function (called the ordinary application hereunder), thereby causing the display portion 98 to display information about the ordinary application in question.

Typical ordinary applications may include one for implementing the e-mail function and browser function. That is, the external apparatus 24 in this example is not executing any specific interlocked application. The display portion 98 of the external apparatus 24 is thus displaying information such as e-mail information not at all related to the program displayed by the reception apparatus 23.

In step S142, the control portion 93 controls the external I/F 91 to determine whether the external apparatus 24 is already connected to the reception apparatus 23.

If in step S142 it is determined that the external apparatus 24 has yet to be connected to the reception apparatus 23, control is passed on to step S143. In step S143, the control portion 93 controls the external I/F 91 to determine whether a device detection query notification is received from the reception apparatus 23. The device detection query notification is given when the reception apparatus 23 performs the process of step S101 in FIG. 19.

If in step S143 it is determined that the device detection query notification is received from the reception apparatus 23, control is passed on to step S144. In step S144, the control portion 93 reads the external apparatus information held in the memory 95 in response to the device detection query notification, and feeds a device detection response including the retrieved external apparatus information to the external I/F 91. The external I/F 91 forwards the device detection response from the control portion 93 to the reception apparatus 23. The external apparatus information thus transmitted is received by the reception apparatus 23 (in step S102 of FIG. 19).

Upon completion of step S144, control is passed on to step S145. If the external apparatus 24 is already connected to the reception apparatus 23 ("Yes" in step S142) or if the device detection query notification has yet to be received from the reception apparatus 23 ("No" in step S143), there is no need to transmit the device detection response. In such a case, step S144 is skipped and control is passed on to step S145.

In step S145, the control portion 93 controls the external I/F 91 to determine whether the activate command is received from the reception apparatus 23. Notification of the activate command is given when the reception apparatus 23 performs step S125 in FIG. 20.

If in step S145 it is determined that the activate command has yet to be received, control is returned to step S141 and the subsequent steps are repeated. That is, the external apparatus 24 continuously executes the ordinary application. Upon receipt of the device detection query notification from the reception apparatus 23, the external apparatus 24 transmits the device detection response including the external apparatus information to the reception apparatus 23.

If in step S145 it is determined that the activate command is received, control is passed on to step S146. In step S146, the control portion 93 causes the display portion 98 to display an activation notification of the second data broadcast application.

In step S147, based on an operation signal from the operation portion 94, the control portion 93 determines whether the user has performed an activation permission operation on the second data broadcast application.

If in step S147 it is determined that the user has yet to perform the activation permission operation on the second data broadcast application, control is returned to step S146. The determination process of step S147 is repeated until it is determined that the activation permission operation has been carried out. In this case, the display time of the application activation notification may be determined beforehand. In case of a timeout on the predetermined display time, the activation of the second data broadcast application may be forcibly suspended. Alternatively, the user's operation to activate the second data broadcast application may be rejected. In such cases, the second data broadcast application is not executed. Control may then be returned to step S141 for example, and information about the ordinary application may be displayed.

If in step S147 it is determined that the activation permission operation on the second data broadcast application has been performed, control is passed on to step S148. In step S148, the application engine 96 activates the second data broadcast application under control of the control portion 93 in accordance with the activate command. Specifically, the application engine 96 controls the communication I/F 97 to acquire the data of the second data broadcast application from the server 22 over the Internet 3, the second data broadcast application being specified by the application acquisition destination included in the activate command. Following the acquisition, the application engine 96 activates the acquired second data broadcast application.

In step S149, the application engine 96 controls the external I/F 91 to transmit the event command to the reception apparatus 23. The event command thus transmitted is received by the reception apparatus 23 (in step S126 of FIG. 20).

In step S150, the control portion 93 controls the external I/F 91 to determine whether the terminate command is received from the reception apparatus 23. Notification of the terminate command is given when the reception apparatus 23 carries out step S129 in FIG. 20.

If in step S150 it is determined that the terminate command has yet to be received, then the determination process of step S150 is repeated. That is, the external apparatus 24 continuously executes the second data broadcast application.

If in step S150 it is determined that the terminate command is received, control is passed on to step S151. In step S151, the application engine 96 terminates the currently executing second data broadcast application under control of the control portion 93 in accordance with the terminate command.

Upon completion of step S151, the resident process in FIG. 21 performed by the external apparatus 24 is terminated.

As explained above, by carrying out the resident process, the external apparatus 24 controls the operation of the second data broadcast application in keeping with the activate command and terminate command sent from the reception apparatus 23. On the other hand, upon activating the second data broadcast application, the external apparatus 24 transmits the event command to the reception apparatus 23.

Figure 22:
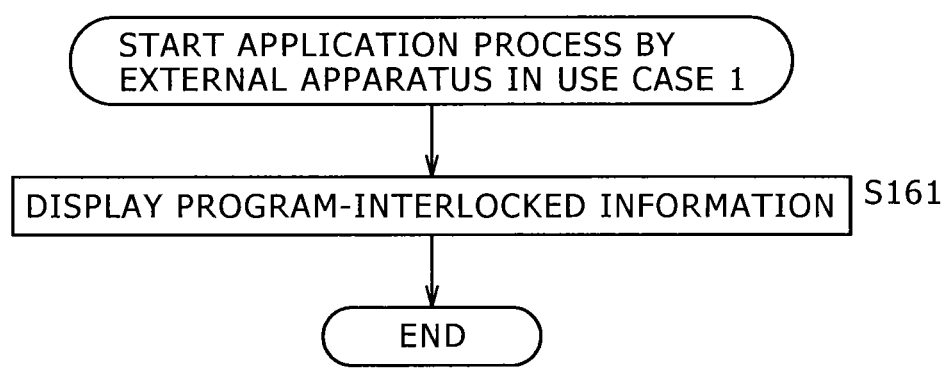
FIG. 22 is a flowchart explanatory of an application process performed by the external apparatus.
Figure 23:
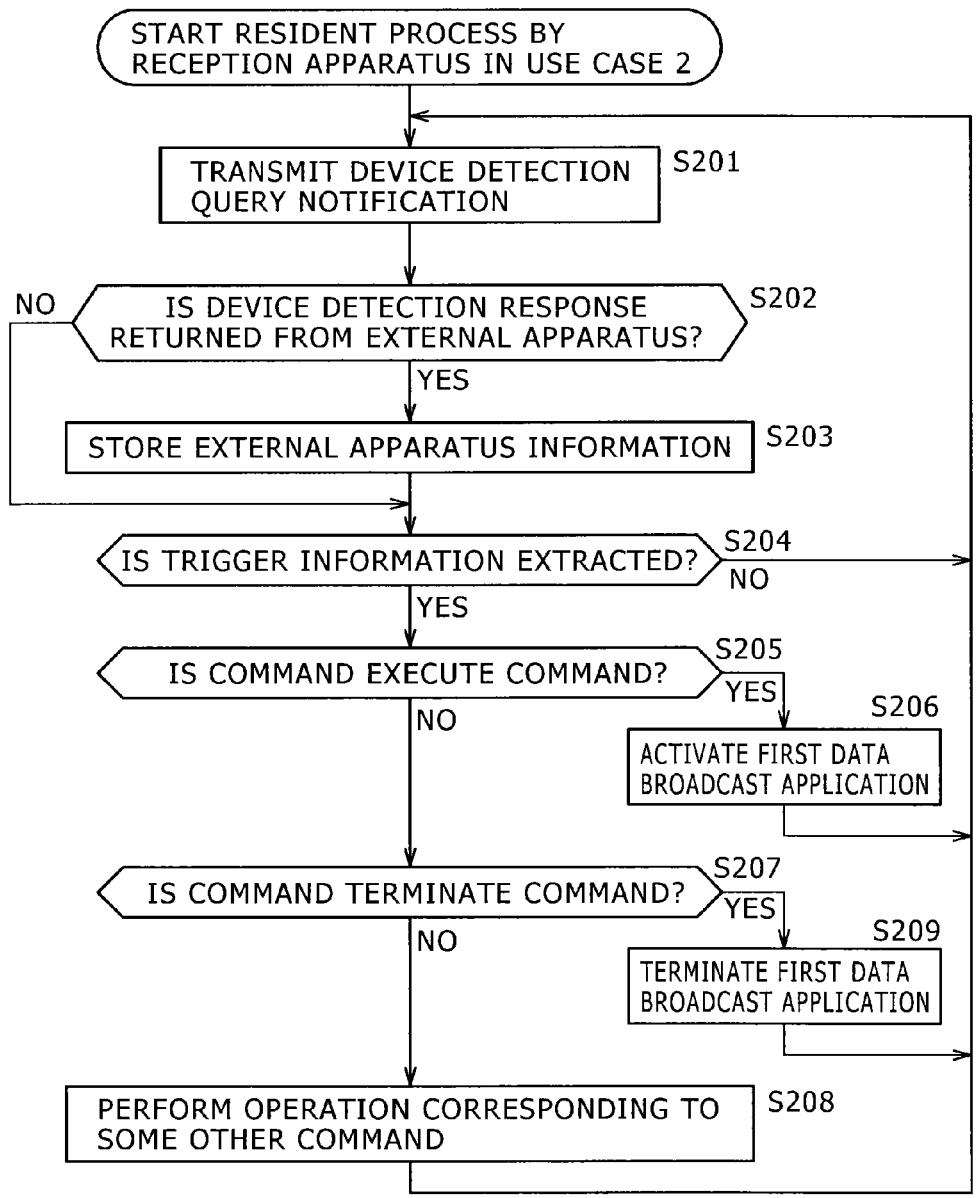
FIG. 23 is a flowchart explanatory of another resident process performed by the reception apparatus.

Explained below in reference to the flowchart of FIG. 22 is the application process performed by the external apparatus 24 in use case 1. The application process shown in FIG. 22 is performed when the application engine 96 executes the second data broadcast application activated in step S148 of FIG. 21.

In step S161, the application engine 96 causes the display portion 98 to display program-interlocked information by executing the second data broadcast application. The application engine 96 continuously displays the program-interlocked information until the second data broadcast application is terminated in step S151 of FIG. 21.

When the second data broadcast application is terminated, the external apparatus 24 terminates the application process in FIG. 22.

As explained above, by carrying out the application process, the external apparatus 24 displays the program-interlocked information from the time the second data broadcast application is activated in response to the activate command from the reception apparatus 23 until the second data broadcast application is terminated in keeping with the terminate command.

In use case 1, as discussed above, on condition that the external apparatus 24 is not executing the second data broadcast application, the reception apparatus 23 transmits the second command (activate command or terminate command) to the external apparatus 24 that is connected during execution of the first data broadcast application in keeping with trigger information. The second command causes the external apparatus 24 to operate the second data broadcast application. For example, use case 1 may be brought about conceivably when the user utilizing the e-mail function of the external apparatus 24 gains access to the reception apparatus 23.

[Interlocked Operations in Use Case 2]

Next, the interlocked operations in use case 2 are explained below in reference to the flowcharts of FIGS. 23 through 26. The resident process performed by the reception apparatus 23 in use case 2 will be described first in reference to the flowchart of FIG. 23.

In steps S201 through S209, as in steps S101 through S109 of FIG. 19, the reception apparatus 23 continuously monitors the connection status of the external apparatus 24 and the status of trigger information extraction. If the external apparatus 24 is connected, the external apparatus information about the connected external apparatus 24 is stored. If trigger information is extracted, the process corresponding to the command designated by the trigger information is executed.

However, use case 2 is different from use case 1 in that, with an interlocked specific application activated by the external apparatus 24, the reception apparatus 23 performs a connection process with the external apparatus 24 currently executing the application process and stores external apparatus information accordingly. That is, in response to the processes of steps S201 and S202, the processes of steps S261 and S262 are carried out as will be explained later, whereby the external apparatus information is transmitted.

Figure 24:
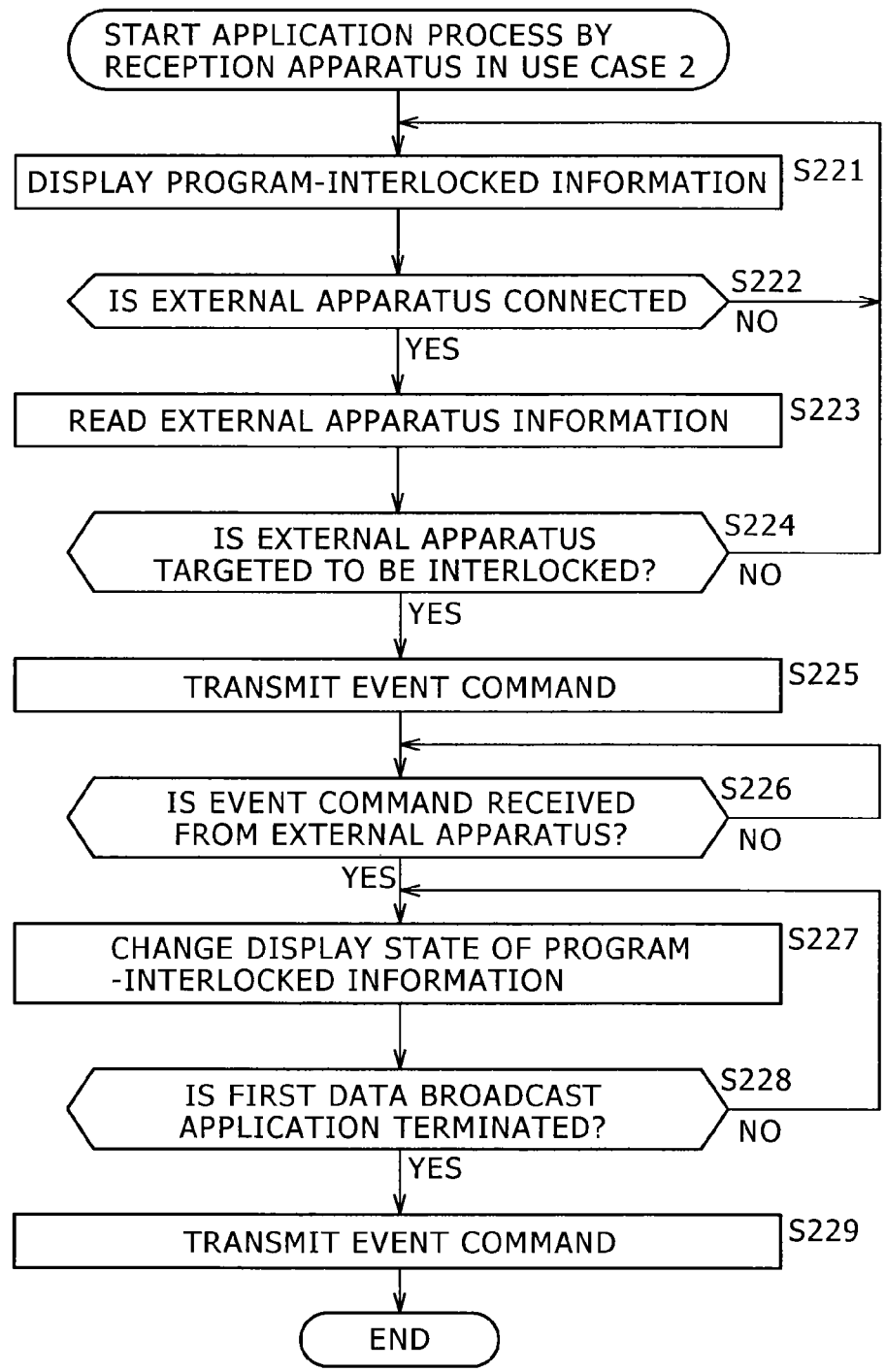
FIG. 24 is a flowchart explanatory of another application process performed by the reception apparatus.

Explained next in reference to the flowchart of FIG. 24 is the application process performed by the reception apparatus 23 in use case 2. The application process in FIG. 24 is carried out when the application engine 73 executes the first data broadcast application activated in step S206 of FIG. 23.

In steps S221 through S224, as in steps S121 through S124 of FIG. 20, the first data broadcast application is executed. Whenever a new external apparatus 24 is connected, it is determined whether the external apparatus 24 in question is targeted to be interlocked. If it is determined that the external apparatus 24 is targeted to be interlocked, control is passed on to step S225.

In step S225, the application engine 73 controls the external I/F 75 to transmit the event command for executing a specific process to the external apparatus 24 targeted to be interlocked. Incidentally, the destination to which to transmit the event command is specified by the access destination information included in the external apparatus information. The event command thus transmitted is received by the external apparatus 24 (in step S265 of FIG. 26, to be discussed later).

In step S226, the application engine 73 controls the external I/F 75 to determine whether the event command is received from the external apparatus 24. The event command is transmitted when the external apparatus 24 causes the interlocked specific application to perform a predetermined operation in response to the event command from the reception apparatus 23 (in step S269 of FIG. 26, to be discussed later).

If in step S226 it is determined that the event command is received, control is passed on to step S227. In step S227, as in step S127 of FIG. 20, the application engine 73 changes the display state of the program-interlocked information in keeping with the received event command. Specifically, the program-interlocked information is changed to one of the states S4-1 through S4-3 shown in FIG. 13.

In step S228, as in step S128 of FIG. 20, it is determined whether the first data broadcast application is terminated. If the currently executing data broadcast application is terminated in response to the terminate command (in step S209 of FIG. 23), then it is determined that the data broadcast application is terminated ("Yes" in step S228) and control is passed on to step S229.

In step S229, the application engine 73 controls the external I/F 75 to transmit the event command for executing a specific process to the external apparatus 24 targeted to be interlocked. Incidentally, the destination to which to transmit the event command is specified by the access destination information included in the external apparatus information. The event command thus transmitted is received by the external apparatus 24 (in step S270 of FIG. 26, to be discussed later).

Upon completion of step S229, the application process in FIG. 24 performed by the reception apparatus 23 is terminated.

During the application process, as explained above, the interlocked specific application is being activated by the external apparatus 24. For that reason, the event command is transmitted in place of the activate command or terminate command so as to control the operation of the interlocked specific application. Also, the event command sent from the external apparatus 24 is received, and the process corresponding to the received event command is carried out.

What follows next is an explanation of the processing performed by the external apparatus 24 targeted to be interlocked with the reception apparatus 23.

Figure 25:
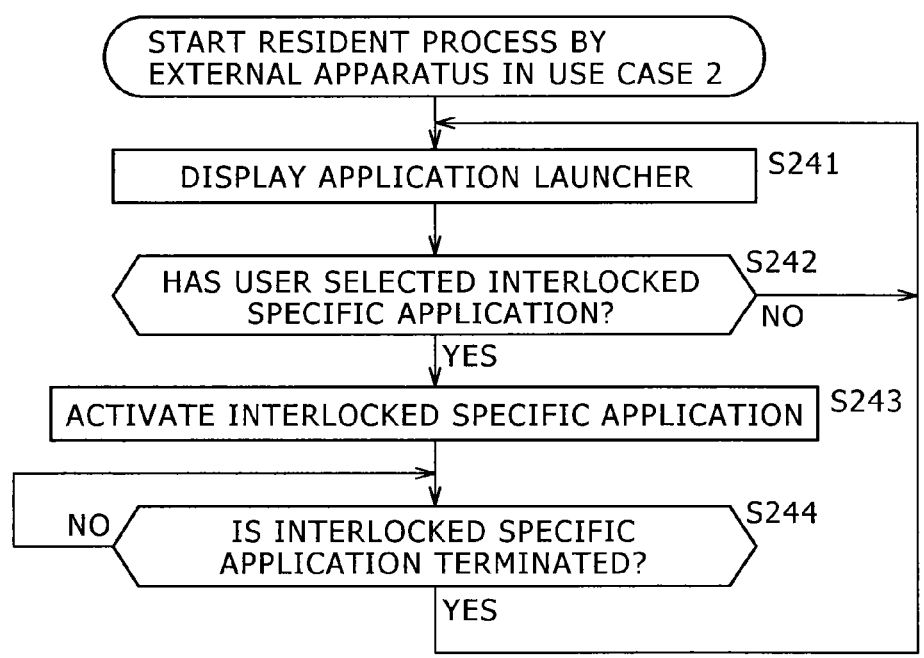
FIG. 25 is a flowchart explanatory of another resident process performed by the external apparatus.

Explained first in reference to the flowchart of FIG. 25 is the resident process carried out by the external apparatus 24 in use case 2.

In step S241, the control portion 93 causes the display portion 98 to display an application launcher for activating an interlocked specific application.

In step S242, based on an operation signal from the operation portion 94, the control portion 93 determines whether the user has selected the interlocked specific application from the application launcher.

If in step S242 it is determined that the interlocked specific application has been selected, control is passed on to step S243. In step S243, the application engine 96 activates the interlocked specific application under control of the control portion 93.

In step S244, the control portion 93 determines whether the interlocked specific application is terminated.

If in step S244 it is determined that the interlocked specific application is not terminated, the determination process of step S244 is repeated. That is, the external apparatus 24 continuously executes the interlocked specific application.

If in step S244 it is determined that the interlocked specific application is terminated, control is returned to step S241 and the subsequent steps are repeated.

During the resident process, as explained above, the external apparatus 24 activates the interlocked specific application for implementing such functions as that of a remote controller independent of the operation of the reception apparatus 23.

Figure 26:
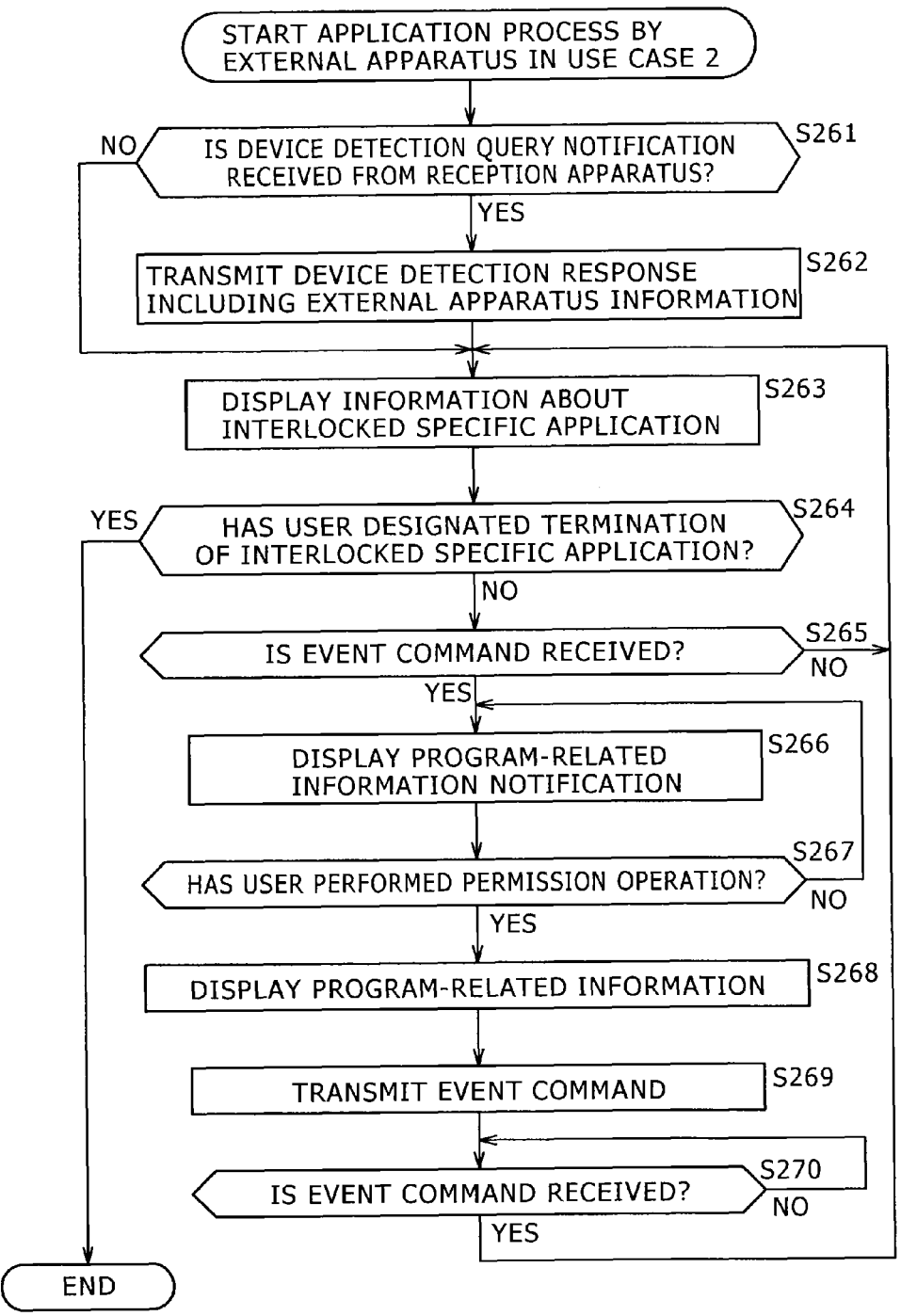
FIG. 26 is a flowchart explanatory of another application process performed by the external apparatus.

Explained below in reference to the flowchart of FIG. 26 is the application process performed by the external apparatus 24 in use case 2. The application process in FIG. 26 is carried out when the application engine 96 executes the interlocked specific application activated in step S243 of FIG. 25.

In step S261, the application engine 96 controls the external I/F 91 to determine whether a device detection query notification is received from the reception apparatus 23. The device detection query notification is given when the reception apparatus 23 executes the process of step S201 in FIG. 23.

If in step S261 it is determined that the device detection query notification is received from the reception apparatus 23, control is passed on to step S262. In step S262, the application engine 96 reads the external apparatus information held in the memory 96 in response to the device detection query notification, and supplies a device detection response including the retrieved external apparatus information to the external I/F 91. The external I/F 91 forwards the device detection response from the control portion 93 to the reception apparatus 23. The external apparatus information thus transmitted is received by the reception apparatus 23 (in step S202 of FIG. 23).

Upon completion of step S262, control is passed on to step S263. If the device detection query notification has yet to be received from the reception apparatus 23, step S262 is skipped and control is passed on to step S263.

In step S263, the application engine 96 executes the interlocked specific application to get the display portion 98 to display information about the interlocked specific application. For example, the information about the interlocked specific application may constitute various operation buttons of a remote controller. As a result, the user can utilize the external apparatus 24 as the remote controller for operating the reception apparatus 23.

In step S264, based on an operation signal from the operation portion 94, the application engine 96 determines whether the user has given an instruction to terminate the interlocked specific application. If in step S264 it is determined that the instruction to terminate the interlocked specific application is given, the application engine 96 terminates the interlocked specific application, and the application process of FIG. 26 is terminated.

If in step S264 it is determined that the instruction to terminate the interlocked specific application has yet to be given, control is passed on to step S265. In step S265, the application engine 96 determines whether the event command is received from the reception apparatus 23. Notification of the event command is given when the reception apparatus 23 executes step S225 in FIG. 24.

If in step S265 it is determined that the event command is received, control is passed on to step S266. In step S266, the application engine 96 causes the display portion 98 to display a program-related information notification.

In step S267, based on an operation signal from the operation portion 94, the control portion 93 determines whether the user has performed a display permission operation on the program-related information.

If in step S267 it is determined that the display permission operation on the program-related information has yet to be performed, control is returned to step S266. The determination process of step s267 is repeated until it is determined that the display permission operation is performed. In this case, similarly to step S147 of FIG. 21, the display time of the program-related information notification may be determined beforehand. Upon elapse of the predetermined display time, the display of the program-related information may be forcibly suspended, or the operation to display the program-related information may be rejected.

If it is determined in step S267 that the display permission operation on the program-related information has been performed, control is passed on to step S268. In step S268, the application engine 96 under control of the control portion 93 displays the program-related information on the display portion 98. Specifically, the application engine 96 may, for example, control the communication I/F 97 to acquire the data of the program-related information from the server 22 over the Internet 3, the program-related information being specified by a program-related information acquisition source described in the event-accompanying information included in the event command. The acquired program-related information may be displayed on the display portion 98.

In step S269, the application engine 96 controls the external I/F 91 to transmit the event command to the reception apparatus 23. The event command thus transmitted is received by the reception apparatus 23 (in step S226 of FIG. 24).

In step S270, the application engine 96 determines whether the event command is received from the reception apparatus 23. Notification of the event command is given when the reception apparatus 23 executes step S229 in FIG. 24.

If in step S270 it is determined that the event command has yet to be received, the determination process of step S270 is repeated. That is, the external apparatus 24 in this case displays the program-related information continuously on the display portion 98.

If in step S270 it is determined that the event command is received, control is returned to step S263, and the display portion 98 is caused to display the information about the interlocked specific application such as the operation buttons of the remote controller, instead of the program-related information. That is, the display on the display portion 98 returns to the state before the program-related information was displayed.

Thereafter, steps S263 through S270 are repeated. When the user gives an instruction to terminate the interlocked specific application ("Yes" in step S264), the application process in FIG. 26 performed by the external apparatus 24 is terminated.

As explained above, by carrying out the application process, the external apparatus 24 displays the program-related information or terminates the currently displayed program-related information in response to the event command from the reception apparatus 23.

In use case 2, as discussed above, on condition that the external apparatus 24 is executing the interlocked specific application, the reception apparatus 23 transmits the second command (event command) to the external apparatus 24 that is connected during execution of the first data broadcast application in keeping with the trigger information. The second command causes the external apparatus 24 to display the program-related information. For example, use case 2 may be brought about conceivably when the user utilizing the external apparatus 24 as the remote controller operates the channel of the program displayed by the reception apparatus 23.

Figure 27:
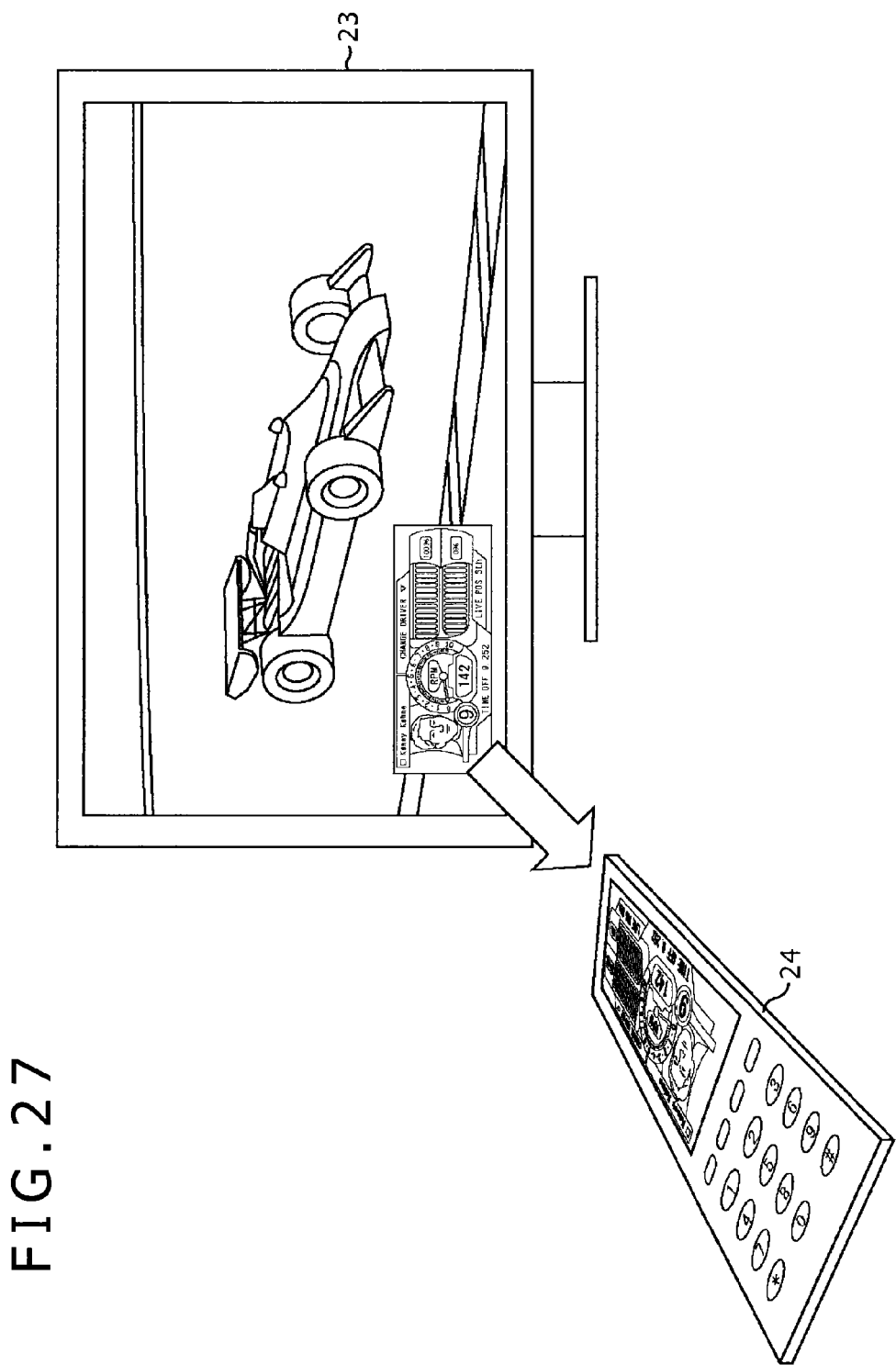
FIG. 27 is a schematic view showing how a data broadcast application is typically interlocked.

FIG. 27 shows how data broadcast applications are typically interlocked between the reception apparatus 23 and the external apparatus 24. Explained below is an example of such interlocking in use case 1.

As shown in FIG. 27, a display unit of the reception apparatus 23 displays an image of the program (AV content) currently received from the broadcasting apparatus 21. In the bottom left corner of the displayed image is program-interlocked information displayed in superposed fashion by the first data broadcast application. When the external apparatus 24 is connected to this reception apparatus 23, the reception apparatus 23 transmits the activate command to the external apparatus 24.

Based on the activate command sent from the reception apparatus 23, the external apparatus 24 acquires the second data broadcast application from the server 22 over the Internet 3 and executes the acquired application. This causes the display portion 98 of the external apparatus 24 to display the same program-interlocked information as that displayed by the first data broadcast application in the bottom left corner of the display on the reception apparatus 23.

And when the display portion 98 of the external apparatus 24 has the program-interlocked information displayed by the second data broadcast application, the reception apparatus 23 deletes from the display the program-interlocked information superposed on the image of the program based on the event command from the external apparatus 24, whereby solely the image of the program is displayed.

In the example above of FIG. 27, it was shown that the same data broadcast application is acquired by both the reception apparatus 23 and the external apparatus 24. If the reception apparatus 23 and external apparatus 24 each acquire a different data broadcast application, then the reception apparatus 23 and external apparatus 24 will execute their different data broadcast applications and display different program-interlocked information.

As explained above, the external apparatus 24 connected to the reception apparatus 23 may be operated in interlocked relation with AV content.

[Typical Structure of Computer]

The series of the processes described above may be executed either by hardware or by software. Where the processes are to be carried out by software, the programs constituting the software may be either incorporated beforehand in the dedicated hardware of the computer to be used or installed from a suitable program recording medium into a general-purpose personal computer or like equipment capable of executing diverse functions based on the installed programs.

FIG. 28 shows a typical hardware structure of a computer for executing the series of the above-described processes using suitable programs.

In this computer 200, a CPU (central processing unit) 201, a ROM (read only memory) 202 and RAM (random access memory) 203 are interconnected via a bus 204.

An input/output I/F 205 is further connected to the bus 204. The input/output I/F 205 is connected with an input device 206 made up of a keyboard, a mouse, a microphone and the like; with an output device 207 typically composed of a display unit and speakers; with a storage device 208 generally constituted by a hard disk and a nonvolatile memory; with a communication device 209 formed by a network I/F or the like; and with a drive 210 that drives removable media 211 such as magnetic disks, optical disks, magneto-optical disks, or semiconductor memories.

In the computer structured as outlined above, the CPU 201 may load relevant programs from, say, the storage device 208 into the RAM 203 for execution via the input/output I/F 205 and bus 204, thereby carrying out the series of the processes discussed above.

Also, the programs for execution by the computer may be processed in the depicted sequence of this specification (i.e., on a time series basis), in parallel, or in otherwise appropriately timed fashion such as when they are invoked as needed.

The programs may be processed by a single computer or by a plurality of computers on a distributed basis. The programs may also be transferred to a remote computer or computers for execution.

In this specification, the term "system" refers to an entire configuration made up of a plurality of component devices.

It should be understood that the present technology when embodied is not limited to the above-described embodiments and that various modifications, variations and alternatives may be made of this technology so far as they are within the scope of the appended claims or the equivalents thereof.

Furthermore, the present technology may also be structured as follows:

[1]

A reception apparatus including:

a reception portion configured to receive AV content being transmitted;

a command execution portion configured to execute a first application program in response to a first command for controlling the operation of the first application program executed in interlocked related to the AV content;

a command transmission portion configured to transmit to an external terminal apparatus a second command for controlling the operation of a second application program that can be executed by the terminal apparatus in interlocked relation to the AV content when the terminal apparatus is connected to the reception apparatus; and a command reception portion configured to receive the first command transmitted from the terminal apparatus executing the second application program;

wherein the command execution portion executes the first application program in response to the received first command.

[2]

The reception apparatus described in [1] above, further including a trigger extraction portion configured to extract trigger information which is transmitted along with the AV content and which pertains to the control of the first application program, wherein the command execution portion executes the first application program in response to the first command designated by the extracted trigger information.

[3]

The reception apparatus described in [1] above, wherein if the terminal apparatus has yet to execute the second application program, the command transmission portion transmits the second command for activating the second application program; and if the reception apparatus has terminated the execution of the first application program, the command transmission portion transmits the second command for terminating the execution of the second application program.

[4]

The reception apparatus described in [1] above, wherein, if the terminal apparatus is executing the second application program, the command transmission portion transmits the second command for causing the second application program to perform a specific process; and if the reception apparatus has terminated the execution of the first application program, the command transmission portion transmits the second command for terminating the currently executing specific process.

[5]

The reception apparatus described in [1] above, wherein, in response to the first command received from the terminal apparatus, the command execution portion either maintains the display of information displayed by the first application program, deletes the display of the information, or updates the display of the information.

[6]

The reception apparatus described in [2] above, wherein:

the trigger information includes the first command designating acquisition, registration, or activation of the first application program, or injection, suspension, or termination of an event; and in response to the first command, the command execution portion executes the acquisition, registration, or activation of the first application program, the injection of an event into the currently executing first application program, the suspension of the currently executing first application program, or the termination of the currently executing first application program.

[7]

A control method including:

receiving AV content being transmitted;

executing a first application program in response to a first command for controlling the operation of the first application program executed in interlocked related to the AV content;

transmitting to an external terminal apparatus a second command for controlling the operation of a second application program that can be executed by the terminal apparatus in interlocked relation to the AV content when the terminal apparatus is connected to the reception apparatus;

receiving the first command transmitted from the terminal apparatus executing the second application program; and executing the first application program in response to the received first command.

[8]

A program for controlling a reception apparatus, the program causing a computer of the reception apparatus to execute a process including:

receiving AV content being transmitted;

executing a first application program in response to a first command for controlling the operation of the first application program executed in interlocked related to the AV content;

transmitting to an external terminal apparatus a second command for controlling the operation of a second application program that can be executed by the terminal apparatus in interlocked relation to the AV content when the terminal apparatus is connected to the reception apparatus;

receiving the first command transmitted from the terminal apparatus executing the second application program; and executing the first application program in response to the received first command.

[9]

A terminal apparatus including:

a command reception portion configured to receive a second command for controlling the operation of a second application program executed in interlocked relation to AV content being received, the second command being transmitted from a reception apparatus executing a first application program in interlocked relation to the received AV content;

a command execution portion configured to execute the second application program in response to the received second command; and a command transmission portion configured to transmit to the reception apparatus a first command for controlling the operation of the first application program in accordance with the operation of the second application program.

[10]

The terminal apparatus described in [9] above, wherein:

if the terminal apparatus is not executing the second application program, the command reception portion receives the second command for activating the second application program; and if the reception apparatus has terminated the execution of the first application program, the command reception portion receives the second command for terminating the execution of the second application program.

[11]

The terminal apparatus described in [10] above, wherein, if a user has permitted the activation of the second application program, the command execution portion activates the second application program in response to the second command

[12]

The terminal apparatus described in [9] above, wherein:

if the terminal apparatus is executing the second application program, the command reception portion receives the second command for causing the second application program to execute a specific process; and if the reception apparatus has terminated the execution of the first application program, the command reception portion receives the second command for terminating the currently executing specific process.

[13]

The terminal apparatus described in [12] above, wherein, if a user has permitted the execution of the specific process, the command execution portion causes the second application program to execute the specific process in response to the second command.

[14]

A control method including:

receiving a second command for controlling the operation of a second application program executed in interlocked relation to AV content being received, the second command being transmitted from a reception apparatus executing a first application program in interlocked relation to the received AV content;

executing the second application program in response to the received second command; and transmitting to the reception apparatus a first command for controlling the operation of the first application program in accordance with the operation of the second application program.

[15]

A program for controlling a terminal apparatus, the program causing a computer of the terminal apparatus to execute a process including:

receiving a second command for controlling the operation of a second application program executed in interlocked relation to AV content being received, the second command being transmitted from a reception apparatus executing a first application program in interlocked relation to the received AV content;

executing the second application program in response to the received second command; and transmitting to the reception apparatus a first command for controlling the operation of the first application program in accordance with the operation of the second application program.

[16]

A communication system including:
a reception apparatus; and
a terminal apparatus;
wherein the reception apparatus includes
a reception portion configured to receive AV content being transmitted,
a first command execution portion configured to execute a first application program in response to a first command for controlling the operation of the first application program executed in interlocked related to the AV content,
a first command transmission portion configured to transmit to the terminal apparatus a second command for controlling the operation of a second application program that can be executed by the terminal apparatus in interlocked relation to the AV content when the terminal apparatus is connected to the reception apparatus, and
a first command reception portion configured to receive the first command transmitted from the terminal apparatus executing the second application program,
the terminal apparatus includes
a second command reception portion configured to receive the second command transmitted from the reception apparatus,
a second command execution portion configured to execute the second application program in response to the received second command, and
a second command transmission portion configured to transmit to the reception apparatus the first command in accordance with the operation of the second application program, and
the first command execution portion executing the first application program in response to the received first command.

What is claimed is:

1. A reception apparatus comprising:
circuitry configured to
receive audio visual content being transmitted;
execute a first application program in response to a first command for controlling the operation of said first application program executed in interlocked relation to said audio visual content;
transmit to an external terminal apparatus a second command for controlling the operation of a second application program that can be executed by said terminal apparatus in interlocked relation to said audio visual content when said terminal apparatus is connected to said reception apparatus; and
receive said first command transmitted from said terminal apparatus executing said second application program;
wherein said circuitry executes said first application program in response to the received first command.

2. The reception apparatus according to claim 1, wherein the circuitry is configured to
extract trigger information which is transmitted along with said audio visual content and which pertains to the control of said first application program; and
execute said first application program in response to said first command designated by the extracted trigger information.

3. The reception apparatus according to claim 2, wherein:
said trigger information includes the first command designating acquisition, registration, or activation of said first application program, or injection, suspension, or termination of an event; and
in response to said first command, said circuitry executes the acquisition, registration, or activation of said first application program, the injection of the event into the currently executing first application program, the suspension of said currently executing first application program, or the termination of said currently executing first application program.

4. The reception apparatus according to claim 1, wherein:
when said terminal apparatus has yet to execute said second application program, said circuitry transmits the second command for activating said second application program; and
when said reception apparatus has terminated the execution of said first application program, said circuitry transmits the second command for terminating the execution of said second application program.

5. The reception apparatus according to claim 1, wherein:
when said terminal apparatus is executing said second application program, said circuitry transmits the second command for causing said second application program to perform a specific process; and
when said reception apparatus has terminated the execution of said first application program, said circuitry transmits the second command for terminating the currently executing specific process.

6. The reception apparatus according to claim 1, wherein, in response to said first command received from said terminal apparatus, said circuitry either maintains a display of information displayed by said first application program, deletes the display of said information, or updates the display of said information.

7. A control method of a reception apparatus comprising:
receiving audio visual content being transmitted;
transmitting to an external terminal apparatus a second command for controlling the operation of a second application program that can be executed by said terminal apparatus in interlocked relation to said audio visual content when said terminal apparatus is connected to said reception apparatus;
receiving a first command transmitted from said terminal apparatus executing said second application program, said first command for controlling the operation of said first application program executed in interlocked relation to said audio visual content; and
executing, by the processor of the reception apparatus, said first application program in response to the received first command.

8. A non-transitory computer-readable storage medium storing a program for controlling a reception apparatus, said program causing a computer of said reception apparatus to execute a process comprising:
receiving audio visual content being transmitted;
transmitting to an external terminal apparatus a second command for controlling the operation of a second application program that can be executed by said terminal apparatus in interlocked relation to said audio visual content when said terminal apparatus is connected to said reception apparatus;
receiving a first command transmitted from said terminal apparatus executing said second application program, said first command for controlling the operation of a first application program executed in interlocked relation to said audio visual content; and executing, by the computer, said first application program in response to the received first command.

9. A terminal apparatus comprising:
circuitry configured to
receive a second command for controlling operation of a second application program executed in interlocked relation to audio visual content being received, said second command being transmitted from a reception apparatus executing a first application program in interlocked relation to the received audio visual content;
execute said second application program in response to the received second command; and
transmit to said reception apparatus a first command for controlling the operation of said first application program in accordance with the operation of said second application program.

10. The terminal apparatus according to claim 9, wherein:
when said terminal apparatus is not executing said second application program, said circuitry receives the second command for activating said second application program; and
when said reception apparatus has terminated the execution of said first application program, said circuitry receives the second command for terminating the execution of said second application program.

11. The terminal apparatus according to claim 10, wherein, when a user has permitted the activation of said second application program, said circuitry activates said second application program in response to said second command.

12. The terminal apparatus according to claim 9, wherein:
when said terminal apparatus is executing said second application program, said circuitry receives the second command for causing said second application program to execute a specific process; and
when said reception apparatus has terminated the execution of said first application program, said circuitry receives the second command for terminating the currently executing specific process.

13. The terminal apparatus according to claim 12, wherein, when a user has permitted the execution of said specific process, said circuitry causes said second application program to execute said specific process in response to said second command.

14. A control method of a terminal apparatus comprising:
receiving a second command for controlling the operation of a second application program executed in interlocked relation to audio visual content being received, said second command being transmitted from a reception apparatus executing a first application program in interlocked relation to the received audio visual content;
executing, by a processor of the terminal apparatus, said second application program in response to the received second command; and
transmitting to said reception apparatus a first command for controlling the operation of said first application program in accordance with the operation of said second application program.

15. A non-transitory computer-readable storage medium storing a program for controlling a terminal apparatus, said program causing a computer of said terminal apparatus to execute a process comprising:
receiving a second command for controlling the operation of a second application program executed in interlocked relation to audio visual content being received, said second command being transmitted from a reception apparatus executing a first application program in interlocked relation to the received audio visual content;
executing, by the computer, said second application program in response to the received second command; and
transmitting to said reception apparatus a first command for controlling the operation of said first application program in accordance with the operation of said second application program.

16. A communication system comprising:
a reception apparatus; and
a terminal apparatus;
wherein said reception apparatus includes circuitry configured to
receive audio visual content being transmitted,
execute a first application program in response to a first command for controlling the operation of said first application program executed in interlocked relation to said audio visual content,
transmit to said terminal apparatus a second command for controlling the operation of a second application program that can be executed by said terminal apparatus in interlocked relation to said audio visual content when said terminal apparatus is connected to said reception apparatus, and
receive said first command transmitted from said terminal apparatus executing said second application program,
said terminal apparatus includes circuitry configured to
receive said second command transmitted from said reception apparatus,
execute said second application program in response to the received second command, and
transmit to said reception apparatus said first command in accordance with the operation of said second application program, and
said circuitry included in the reception apparatus being configured to execute said first application program in response to the received first command.

17. The reception apparatus according to claim 1, wherein the circuitry is configured to
output the received audio visual content for display, and
execute the first application in interlocked relation to the displayed audio visual content.

18. The reception apparatus according to claim 9, wherein the second application program is executed in interlocked relation to audio visual content being received and reproduced by the reception apparatus.

19. The reception apparatus according to claim 1, wherein
the first application program is downloaded by the circuitry; and
the second application program is downloaded by the external terminal apparatus.

* * * * *